(12) United States Patent
Gregory et al.

(10) Patent No.: US 9,568,351 B1
(45) Date of Patent: Feb. 14, 2017

(54) WATER METER TECHNOLOGY

(71) Applicants: Michael Lee Gregory, Hallsville, TX (US); Johnathan Scott Ratliff, Glenn Heights, TX (US); Travis Sparks, Longview, TX (US)

(72) Inventors: Michael Lee Gregory, Hallsville, TX (US); Johnathan Scott Ratliff, Glenn Heights, TX (US); Travis Sparks, Longview, TX (US)

( * ) Notice: Subject to any disclaimer, the term of this patent is extended or adjusted under 35 U.S.C. 154(b) by 105 days.

(21) Appl. No.: 14/530,647

(22) Filed: Oct. 31, 2014

Related U.S. Application Data

(60) Provisional application No. 62/037,155, filed on Aug. 14, 2014.

(51) Int. Cl.
| | | |
|---|---|---|
| *G01F 15/14* | (2006.01) | |
| *G01F 1/06* | (2006.01) | |
| *G01F 15/18* | (2006.01) | |
| *G01F 15/06* | (2006.01) | |
| *G01F 3/12* | (2006.01) | |

(52) U.S. Cl.
CPC ............... *G01F 15/14* (2013.01); *G01F 1/06* (2013.01); *G01F 3/12* (2013.01); *G01F 15/063* (2013.01); *G01F 15/18* (2013.01); *G01F 15/185* (2013.01)

(58) Field of Classification Search
CPC ........................................................ G01F 15/14
USPC ........................................................... 73/273
See application file for complete search history.

(56) References Cited

U.S. PATENT DOCUMENTS

| | | | | |
|---|---|---|---|---|
| 602,377 | A | | 4/1898 | Thomson |
| 786,724 | A | * | 4/1905 | Browne ................... G01F 15/14 292/307 R |
| 2,016,606 | A | * | 10/1935 | Krueger ................... G01F 15/14 220/259.2 |
| 3,067,612 | A | * | 12/1962 | Smith ...................... G01F 15/07 73/273 |
| 3,068,696 | A | * | 12/1962 | Smith ...................... G01F 15/14 73/273 |
| 3,308,664 | A | * | 3/1967 | Kullmann ................. G01F 3/12 73/201 |
| 4,663,970 | A | * | 5/1987 | Sutherland .............. G01F 15/14 73/273 |
| 5,339,686 | A | * | 8/1994 | DeJarlais .............. G01F 15/185 73/201 |
| 5,546,801 | A | * | 8/1996 | Swinson ................... G01F 3/12 73/238 |
| 5,557,041 | A | * | 9/1996 | Sanford, Jr. ............ G01F 15/14 73/201 |
| 6,363,782 | B1 | | 4/2002 | Hendey |
| 6,588,447 | B1 | | 7/2003 | Hendey |
| 7,412,882 | B2 | * | 8/2008 | Lazar .................... G01F 15/063 73/273 |
| D582,814 | S | * | 12/2008 | Ball ............................... D10/96 |
| D583,692 | S | * | 12/2008 | Ball ............................... D10/96 |
| 7,640,944 | B2 | | 1/2010 | Zakai |

(Continued)

*Primary Examiner* — Clayton E Laballe
*Assistant Examiner* — Kevin Butler
(74) *Attorney, Agent, or Firm* — Simmons Patents; Monty Simmons

(57) ABSTRACT

Disclosed is fluid meter housing technology comprising removable covers where such covers are associated with meter housings without using bolts. The water meters are further designed with a "weakest link" component configured to fail under overpressure conditions to minimize damage to more expensive metering components.

20 Claims, 24 Drawing Sheets

(56) References Cited

U.S. PATENT DOCUMENTS

| | | | |
|---|---|---|---|
| 7,661,423 B2 * | 2/2010 | Brand | A61M 15/009 |
| | | | 128/200.23 |
| D630,536 S * | 1/2011 | Pettit | D10/96 |
| 8,353,208 B2 * | 1/2013 | Chu | G01F 15/006 |
| | | | 428/35.7 |
| D680,457 S | 4/2013 | Hendey, Sr. | |

* cited by examiner

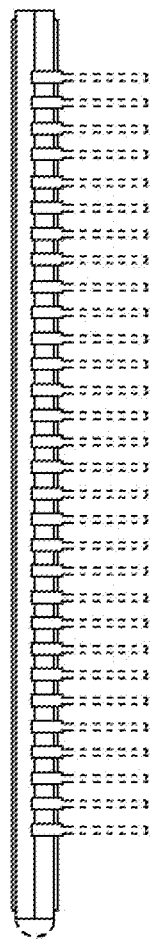
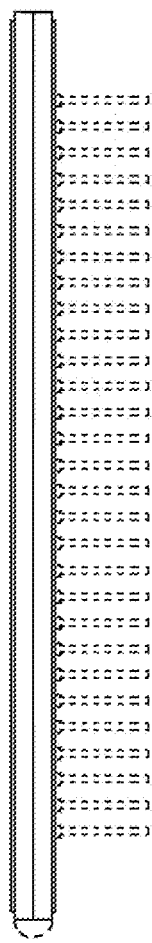
Fig. 19
Fig. 20

WATER METER TECHNOLOGY

CLAIM TO PRIORITY

This application claims priority to provisional application 62/037,155, filed 14 Aug. 2014, of which the entire contents of such reference is hereby incorporated herein by this reference for all that it discloses for all purposes.

TECHNICAL FIELD

The inventions relate to the field of water meters comprising removable covers where such covers are associated with meter housings without using bolts. The water meters are further designed with a "weakest link" component configured to fail under overpressure conditions to minimize damage to more expensive metering components.

BACKGROUND OF THE INVENTION

Fluid flow meters are used to measure the volume of fluid flowing through a system. For example, water meters are used in residential and commercial environments being supplied with water by a public water utility.

A diverse spectrum of water metering technologies is being used today to meter water flow. One exemplarily technology is positive displacement water meters. Such technology may use oscillating pistons in communication with register technology that registers the volume of fluid flow by counting the number of times a chamber of a known volume is filled with water and emptied.

For positive displacement meters, water enters one side of the meter housing and flows into a measuring chamber to the flow measuring elements comprising a rotation piston. Due to a higher pressure at the input of the meter, water is pushed through the meter causing the piston to rotate causing a reciprocating motion forcing a second compartment to be emptied as a first compartment is filled. With each rotation of the piston, the same volume of water enters and leaves the measuring chamber. Typically, a magnetic element is associated with a rotating element to generate a varying magnetic field that is detected by register components.

To install the flow measuring elements in such a meter, the meter housing is associated with a removable cover or plate. Prior art meters use bolts and nuts to associate the cover to the meter housing. Using bolts and nuts not only increases assembly time, such components increase the meter's part count.

Embodiments of the disclosed inventions lower a meter's part count and simplify meter assembly by eliminating the use of bolts for associating a cover to such meter's housing.

Another area where residential water meters can be improved relates to backflow preventers and check valves. If the pressure of the water source fails and becomes lower than the pressure at a water consumer, water can backflow from the water consumer through the water meter and back into the water source. If such back flow is contaminated the water source becomes contaminated which is supplied to "downstream" consumers. Additionally, back flow from a residential consumer can cause the consumer's water heater to drain of all water thereby damaging such water heater.

Embodiments of the disclosed inventions relate to configuring a water meter's input and output ports with back flow preventers/check valves to prevent fluid flow from a fluid consumer to a fluid supply system.

Another problem that water meter manufacturers face is damage to the meter caused by over pressure conditions. If the pressure inside the water meter housing exceeds the rated water pressure, the water meter can be destroyed and/or the measuring elements may be damaged affecting the meter's accuracy. One phenomenon that can cause an over pressure condition is the freezing of the fluid inside the meter housing.

Embodiments of the present invention address such issues by designing in a "weakest link". During over pressure conditions, the weakest link fails thereby releasing the pressure inside the meter housing protecting the remaining components. Preferably, replacing the weakest link results in the lowest repair costs compared to other meter components.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide an apparatus and method for associating a cover to a meter's housing without using bolts and/or nuts.

Another general principle object of the present invention is to design in a weakest link component that will fail under over pressure conditions.

Yet another general principle object of the present invention is to configure a water meter's input port and output port with flow control devices that prevent fluid flow from the meter output to the meter input.

Still another general object of the present invention is to configure a water meter's input port and output port with flow control devices that prevent fluid flow from the meter output to the meter input while also providing a flow limiting function.

Further general principle objects of the present invention related to novel ornamental designs for items including displays and circuit boards.

For one exemplary embodiment of the invention, a fluid flow meter is configured for measuring a fluid flow parameter. The meter comprises a housing assembly comprising a housing removably associated with a cover. The housing defines a cover receiver portion further comprising a distal-end and receiver inner-wall configured for receiving said cover. The housing and cover define a void there between configured for receiving flow measurement components.

Flow measurement elements are disposed in the housing-void and configured to generate flow-signals indicative of the rate of fluid flow through said housing assembly.

The outer surface of the housing further defines a register interface configured for being mechanically associated with a register. A register is associated with the register interface where said register is configured to detect the flow-signals and generate fluid flow data.

The meter housing further comprises an input-port and an output-port wherein said input-port is configured for being associated with a fluid source to allow fluid flow into said housing-void and said output-port is configured for being associated with a supply line to allow fluid flow out of said housing-void.

The cover is associated with the meter housing without using bolts. The cover receiver portion (defined by the meter housing) defines a receiver inner-wall which further defines a shelf that extends perpendicularly form the receiver inner-wall a predefined distance thereby defining a shelf-surface having a shelf-width. The shelf is located a predefined shelf-offset-distance from said distal-end. The shelf-surface defines a sealing-member-receiver (e.g. groove, channel) running angularly along said shelf-surface. Such sealing-member-receiver is configured for receiving a sealing-member such as an O-ring.

The cover defines inside cover surface and an opposing outside cover surface connected by a peripheral edge. The inside cover surface defines a sealing surface running along the perimeter of the inside cover surface. Such sealing surface is suitably configured to be associated with the sealing-member.

A retaining-element-receiver (groove, channel, threads etc.) runs along the surface of the receiver inner-wall and is configured to receive a cover-retaining-element suitably configured to securely associated with said retaining-element-receiver thereby removably associating the cover with said housing to form a fluid tight association between the cover and said housing over a predefined working fluid pressure.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 7b is a side elevational close up view of housing area 37 depicted in FIG. 7a;

FIG. 19 is a bottom plan view thereof;

FIG. 20 is a top plan view thereof;

Figure 1:
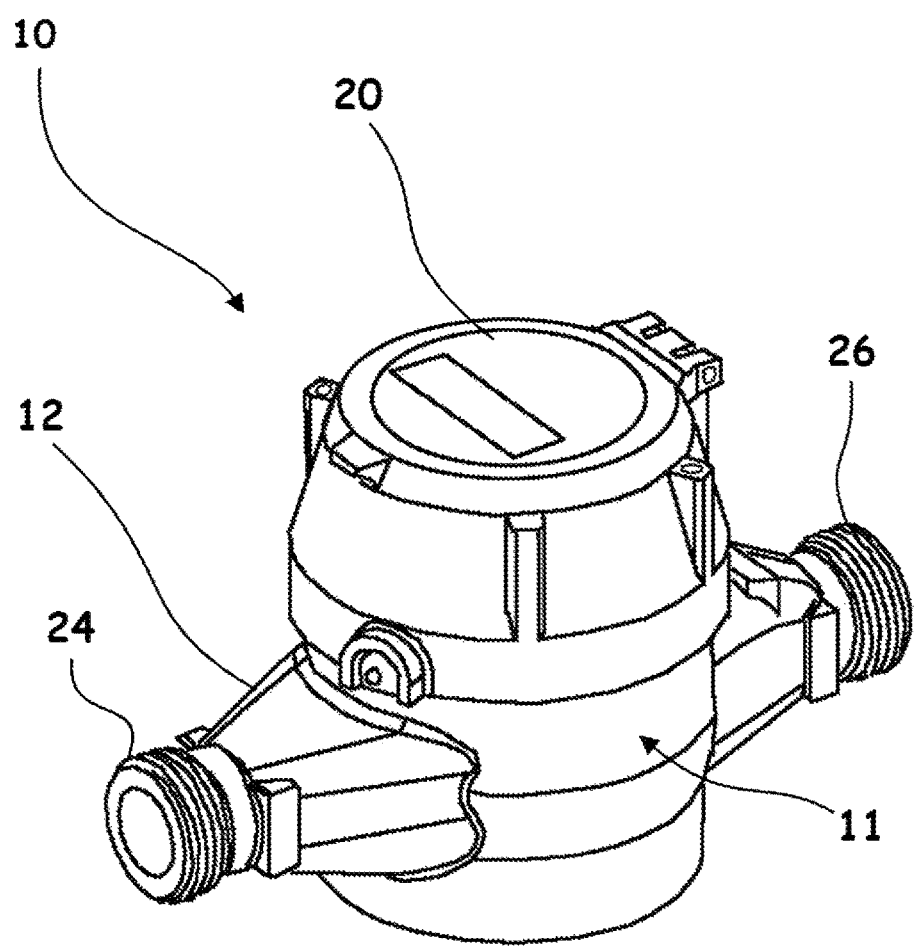
FIG. 1 is an elevated perspective view of an exemplary water meter (10)

Repeat use of reference characters throughout the present specification and appended drawings is intended to represent the same or analogous features or elements of the present technology.

DISCLOSURE OF THE INVENTION

Detailed Description

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Construction Aids

For the purposes of this document two or more items are "mechanically associated" by bringing them together or into relationship with each other in any number of ways including a direct or indirect physical connection that may be intended to be releasable (e.g. snaps, rivets, screws, bolts, etc.) and connections that not intended to be easily disconnected such as (e.g. welding, sowing, etc.) and connections that are intended to be movable (e.g. rotating, pivoting, oscillating, etc.). For example, items that are merely "mechanically associated" are broader embodiments of items that are "mechanically associated using bolts".

Similarly, for the purposes of this document, two items are "electrically associated" by bringing them together or into relationship with each other in any number of ways. For example, methods of electrically associating two electronic items/components include: (a) a direct, indirect or inductive communication connection, and (b) a direct/indirect or inductive power connection. Additionally, while the drawings may illustrate various components of the system connected by a single line, it will be appreciated that such "single-line" may represent one or more connections or cables as required for the embodiment of interest.

This document includes headers that are used for place markers only. Such headers are not meant to affect the construction of this document and are not in any way related to the meaning of this document nor should such headers be used for such purposes.

While the particulars of the present invention and associated technology may be described for use with water meters as has been done in this document, the invention may be adapted for use with any type of fluid flow meter.

DESCRIPTION

Figure 2:
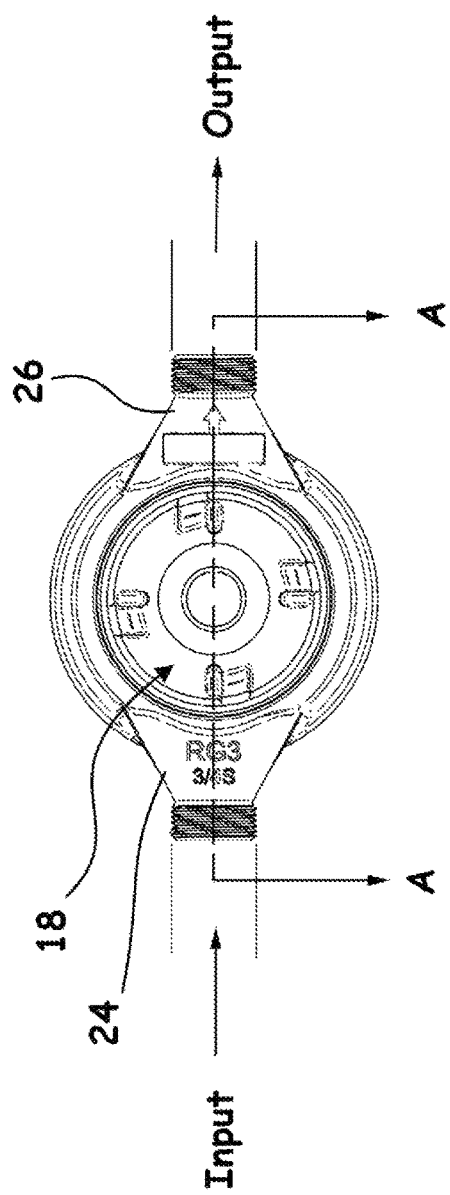
FIG. 2 is a top plan view of a meter housing assembly according to one exemplary embodiment of the invention.
Figure 5:
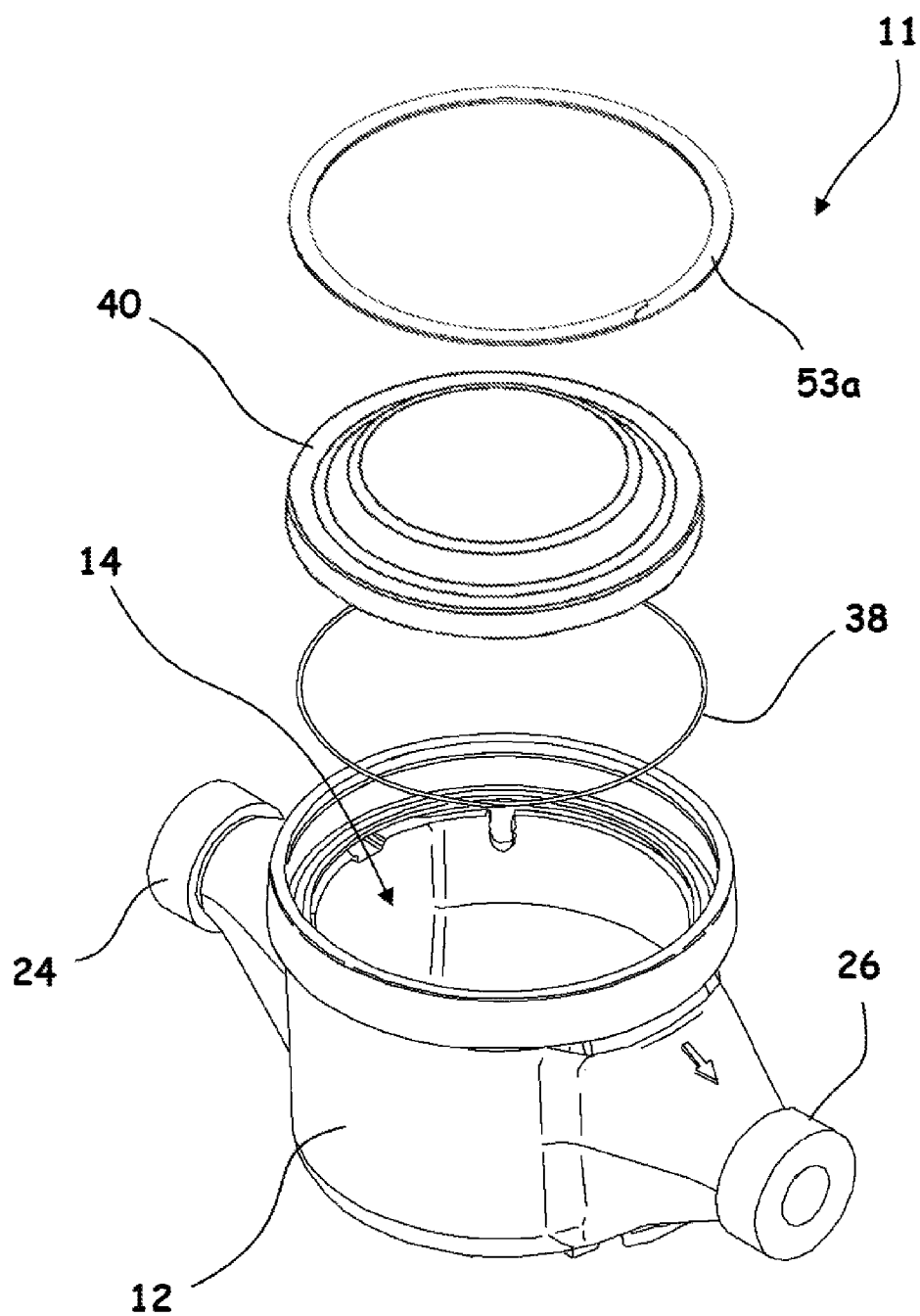
FIG. 5 is an exploded perspective view of one exemplary embodiment of a meter housing assembly.

Referring now to FIG. 1 and FIG. 5, a fluid flow meter (10) according to one exemplary embodiment of the invention is presented. Flow meter (10) is configured for measuring at least one predefined flow parameter for a fluid (e.g. water) flowing through flow meter (10) and generate electric/magnetic signals relatable to a detected flow parameter or property. Fluid meter (10) comprises a housing assembly (11) comprising a housing (12) removably associated with a register (20). Housing (12) is further removably associated with a cover (40, FIG. 5) to define a housing-void (14, FIG. 5) there between. The housing-void (14) is configured for receiving flow measurement components (not shown). As best seen in FIG. 2, an outer surface of housing (12) further defines a register interface (18) configured for being mechanically associated with a register (20). FIG. 5 presents an exploded view of one exemplary embodiment of housing assembly (11) comprising a housing (12), sealing-member (38), cover (40), and retaining ring (53a).

Flow measurement elements (not shown) are disposed in the housing-void (14) and are configured to generate electric/magnetic signals relatable to a fluid flow parameter for the fluid flowing through meter (10). Register (20) is associated with register interface (18) thereby placing register (20) in communication with the flow measurement elements so that register (20) can detect and use the generated electric/magnetic signals to perform at least one predefined function including one or more of (a) calculating fluid consumption data, (b) detecting leaks, (c) displaying data on a display device, and (d) generating utility data that is communicated to a remote electronic device via a wired or wireless communication method. Flow measurement components, such as the positive displacement technology described earlier, are well known by those of ordinary skill in the art making a detailed description thereof unnecessary to provide an enabling disclosure.

Figure 6A:
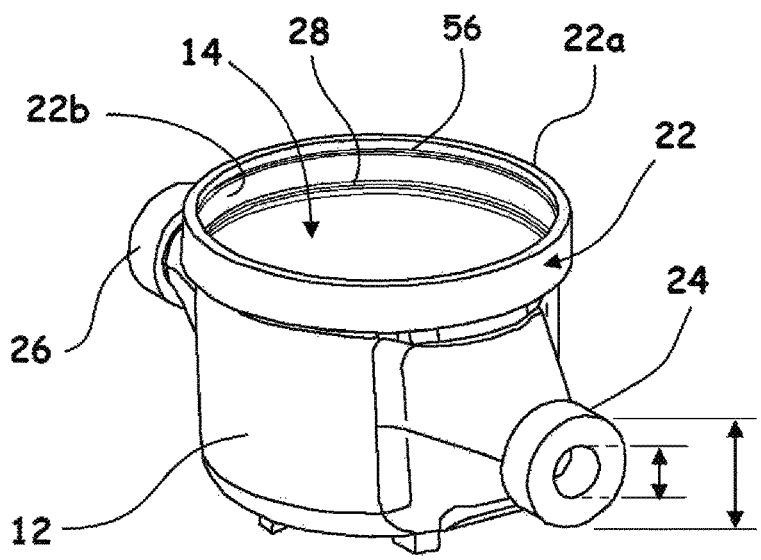
FIG. 6a is a bottom side perspective view of a meter housing showing a cover receiver portion (22)
Figure 6B:
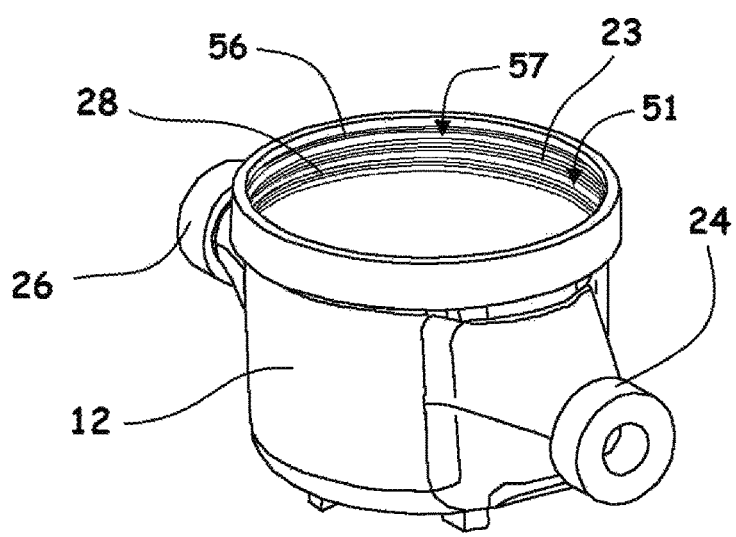
FIG. 6b is a bottom side perspective view of a meter housing showing an alternative configuration of a cover receiver portion comprising threads.
Figure 7A:
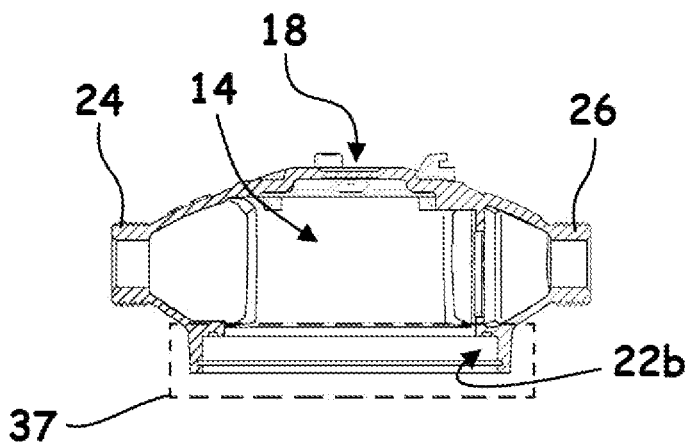
FIG. 7a is a side elevational view of the meter housing depicted in FIG. 4 from the perspective of cut away section A.
Figure 7B:
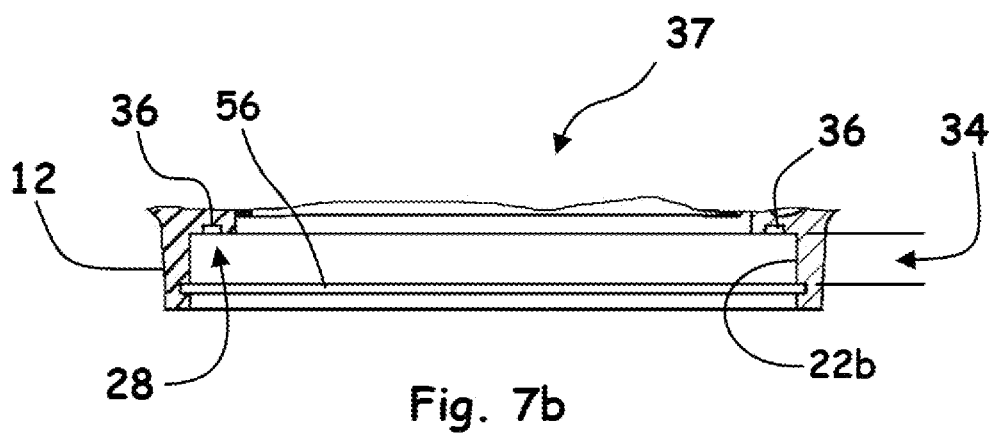
Figure 7C:
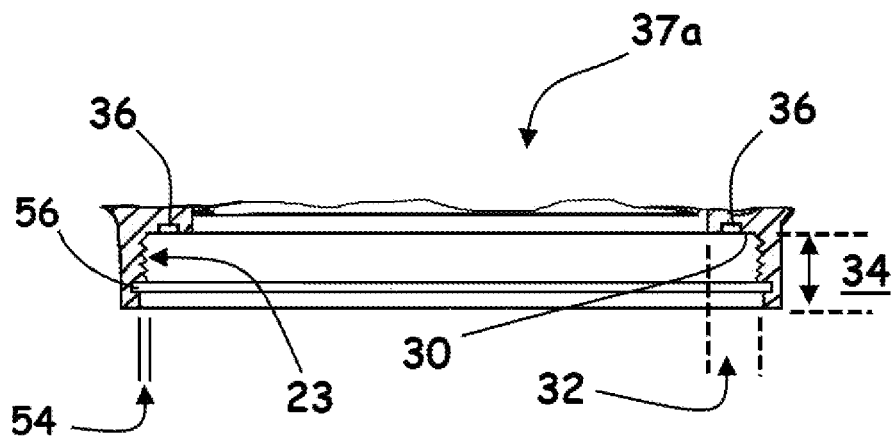
FIG. 7c is a side elevational close up view of one alternative embodiment of housing area 37 depicted in FIG. 7a where the cover receiver portion (22) defines threads.

Attention is now directed to FIG. 6a and FIG. 6b (referred to collectively as FIG. 6) and FIG. 7a, FIG. 7b, and FIG. 7c (referred to collectively as FIG. 7).

As best seen in FIG. 6 and FIG. 7, housing (12) defines a cover receiver portion (22) defining a distal-end (22a) and receiver inner-wall (22b) configured for receiving a cover (40). For the currently preferred embodiment, the receiver inner-wall defines a height of about 0.6 inches which is also referred to as the shelf-offset-distance discussed later. Housing (12) further comprises an input-port (24) and an output-port (26). The input-port (24) is configured for being associated with a fluid source (such as the water pipe of a water supplier) to allow fluid flow into said housing-void (14) and to the flow measurement components. The output-port (26) is configured for being associated with a supply line (e.g. a residential water pipe connected to a residential housing water system) to allow fluid flow out of the housing-void (14). It will be appreciated that the input-port and output-port for the housing (12) embodiment depicted in FIG. 6 do not show threads. While threads are the traditional coupling technology used by prior art devices, any suitable connection/coupling technology may be used for coupling the meter (10) to external flow paths.

As best seen in FIG. 6 and the close-up views presented in FIG. 7b and FIG. 7c, novel features of the cover receiver portion (22) are considered in more detail. The receiver inner-wall (22b) perimeter defines a polygonal shape (for this document, polygons include circles). For the current embodiment the perimeter defines a circle having a diameter of about 4.62 inches. Receiver inner-wall (22b) further defines a shelf (28) that extends perpendicularly form said receiver inner-wall (22b) a predefined distance thereby defining a shelf-surface (30) having a shelf-width (32, FIG. 7c). For the preferred embodiment, the shelf-width (32) is about 0.7 inches. The perimeter of shelf (28) does not necessarily form the same shape as receiver inner-wall (22a), however, shelf (28) preferably defines a circular perimeter to make forming a seal easier as described later. For the currently preferred embodiment, the inner perimeter of both receiver inner-wall (22b) and shelf (28) form a circle where the receiver inner-wall "circle" diameter is about 4.62 inches and the shelf "circle" diameter 3.93 inches providing a shelf width of about 0.7 inches.

The shelf (28) is located a predefined shelf-offset-distance (34, FIG. 7c) from the distal-end (22a). For the currently preferred embodiment, the offset distance is about 0.575 inches. Ideally the shelf-offset-distance (34) is greater than the perimeter thickness (48, FIG. 11) of cover (40) (which is 0.371 inches for the currently preferred embodiment). The shelf-surface (30) further defines a sealing-member-receiver (36) running angularly along the shelf-surface (30). Sealing-member-receiver (36) is configured for receiving a sealing-member (38, FIG. 5). Embodiments of sealing-member (38) include O-rings and gasket materials. For example, the sealing-member-receiver (36) may be a simple flat surface where the sealing-member (38) is a gasket. For the preferred embodiment, the sealing member-receiver (36) is a groove or channel and the sealing-member (38) is an O-ring. The sealing-member (38) is preferably removably associated with said sealing-member-receiver (36) and provides a leak proof seal up to at least 200-psi.

Figure 11:
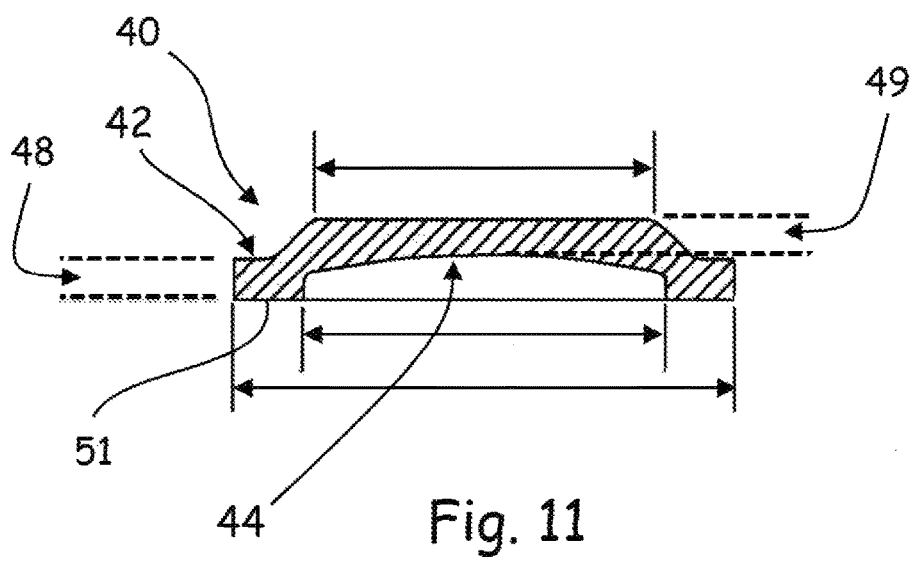
FIG. 11 is a side elevational view of a cover looking into cut away section A.

Referring now to FIG. 9a, FIG. 9b, FIG. 10 and FIG. 11, cover (40) is considered in more detail. Cover (40) may comprise a plate like structure defining an inside cover surface (44) and an opposing outside cover surface (42) connected by a peripheral edge (46). As discussed later, peripheral edge (46) may define threads (46a). As best seen in FIG. 11, cover (40) further defines a perimeter-cover-thickness (48) (about 0.371 inches maximum for the current embodiment) and an inner-cover-thickness (49) (about 0.317 inches minimum for the current embodiment). Perimeter-cover-thickness (48) may or may not be equal to inner-cover-thickness (49). The inside cover surface (44) further defines a sealing surface (51) running along the perimeter of said inside cover surface (44). One of ordinary skill in the art will appreciate that cover (40) is suitably configured to be associated with cover receiver portion (22) so that the sealing surface (51) is associated with sealing-member (38).

Referring now to close up views in FIG. 7b and FIG. 7c, the cover (40) retaining system is considered in more detail. One of ordinary skill in the art will appreciate that such systems are required to maintain the sealing surface (51) association with sealing-member (38) so that such association is leak proof over a predefined pressure rating. As previously noted, cover receiver portion (22) comprises a receiver inner-wall (22b). The retaining-element-receiver is configured for being securely and removably associated with a cover-retaining-element so that cover (40) maintains a fluid tight association with housing (12) over a predefined working fluid pressure.

Retaining Element

As best seen in FIGS. 7b and 7c, one embodiment of a retaining-element-receiver is wall-channel (56) (for the currently preferred embodiment about 0.378 inches wide) running angularly around/along the surface of the receiver inner-wall (22b). Such wall-channel (56) is disposed along said receiver inner-wall (22b) at a distance greater than or equal to the perimeter-cover-thickness (48, FIG. 11) from said shelf-surface (51) (about 0.378 inches for the current embodiment). For the currently preferred embodiment an exemplary cover retaining element is retaining ring (53a, FIG. 12a).

Figure 12A:
FIG. 12a a is a side elevational view of a multiple layer retaining ring with the multiple lawyers pulled slightly apart.
Figure 12B:
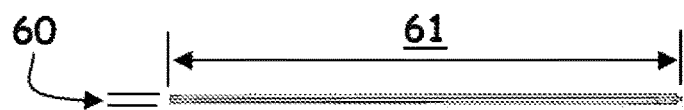
FIG. 12b a is a side elevational view of a retaining ring with the multiple lawyers adjacent to each other and in horizontal alignment.
Figure 12C:
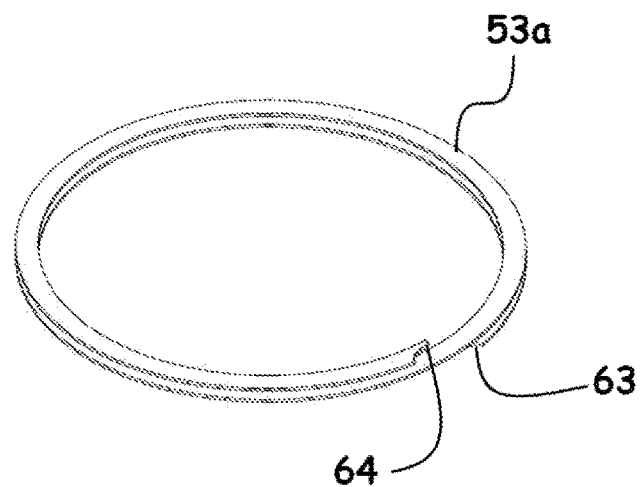
FIG. 12c a top perspective view of a retaining ring with the multiple lawyers pulled slightly apart.
Figure 13:
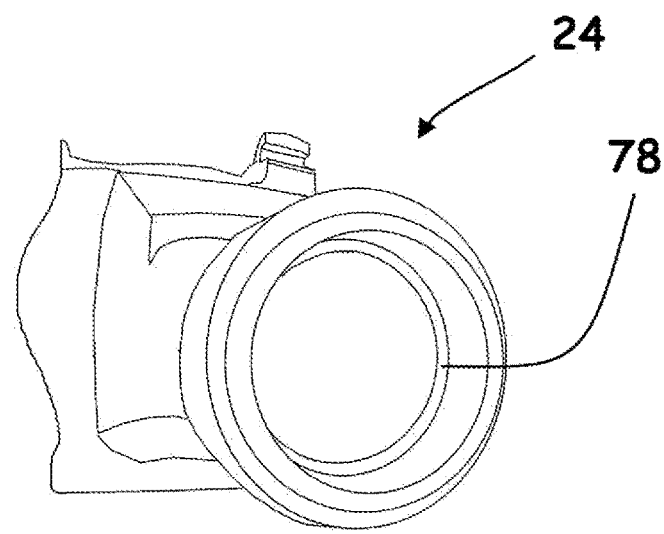
FIG. 13 is a side perspective view of and meter port defining a flow-control-device interface.

Referring now to FIGS. 12a, 12b, and 12c, one exemplary embodiment of a retraining element, retaining ring (53a), is considered. For the currently preferred embodiment, retaining ring (53a) is made of hardened steel and defines a near-720-loop that defines an overall-ring-thickness (60) and an overall ring-diameter (61) that is suitably sized for being removably mechanically associated with wall-channel (56). As best seen in FIG. 12c, for the purposes of this document, a retaining ring defines a near-720-loop when such ring starts at starting point (63) and loops around, almost twice, in a circle to an ending point (64) that fails to form two full circles but is no more than 90 degrees short of forming two full circles where the second near circle loops over the first circle (i.e. a "coil" type configuration). Such a configuration allows the retaining ring (53a) to be more flexible and easier to install than a single loop ring of the same thickness as a two loop (near-720-loop) ring. One of ordinary skill in the art will appreciated that retaining-ring (53a) may be formed of any suitable material including brass, steel, and composite materials. For one embodiment, retaining-ring (53a) is formed of a material and a thickness to make it the "weakest link" in the structural integrity of the housing assembly (11) so that the retaining-ring fails should the pressure in housing assembly (11) exceed the rated pressure for whatever reason including expansion of the fluid due to freezing.

One alternative embodiment of a retaining-element-receiver (53) comprises receiver inner-wall threads (23, FIG. 7c) disposed along said receiver inner-wall (22b). The location of receiver inner-wall (22b) is a point between the shelf-surface (30) and distal-end (22a) to a predefined thread-end-point (57, FIG. 6b). Restated, the distance across the threads is less than the distance from shelf surface (30) to distal-end (22a). Note that receiver inner-wall (22b) may define a thread-offset (54) when threads (23) are used.

Figure 9A:
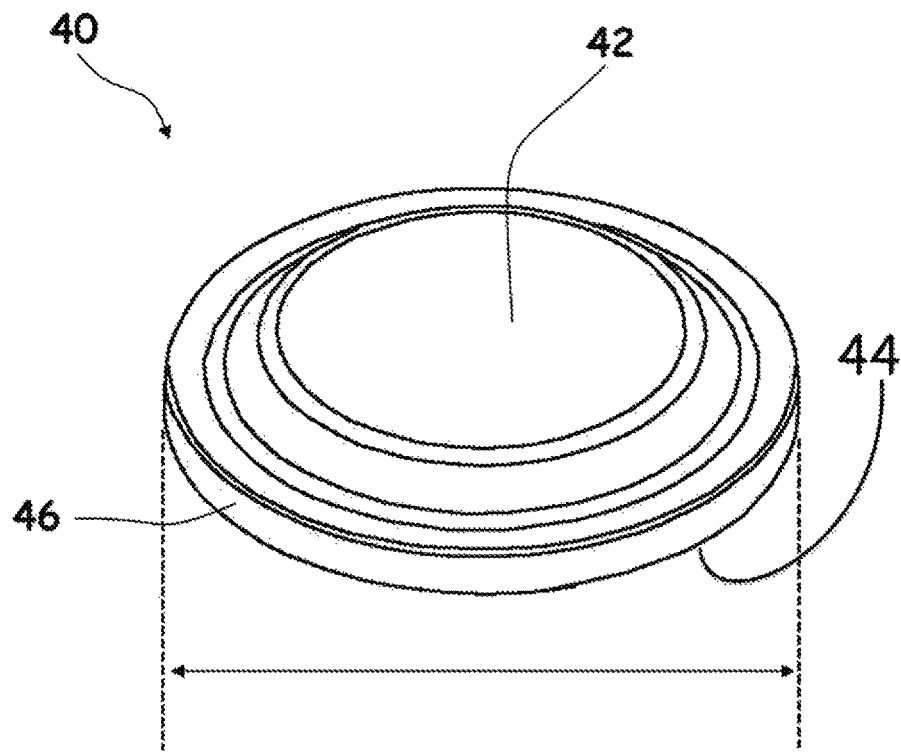
FIG. 9a is a top perspective view of one exemplary embodiment of a cover.
Figure 9B:
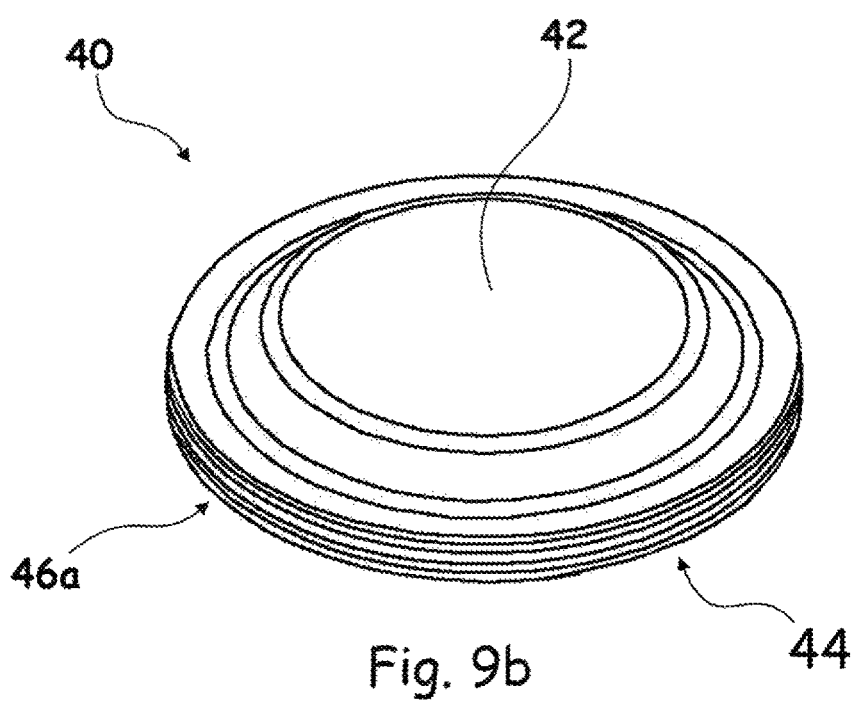
FIG. 9b is a top perspective view of one exemplary alternative embodiment of a cover where the peripheral edge defines threads.
Figure 10:
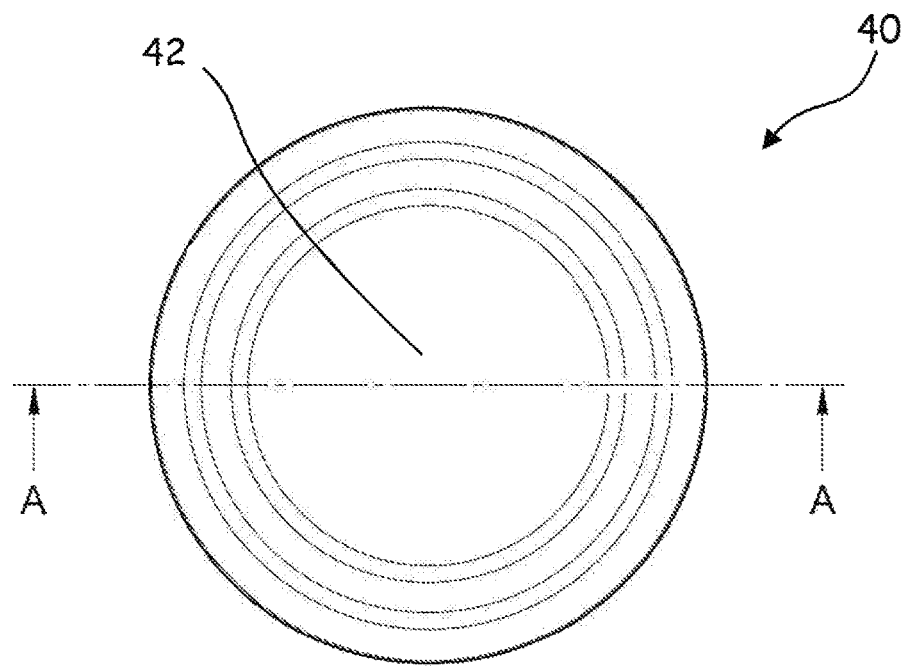
FIG. 10 is a top plan view of a cover defining cut away section A.

For such currently preferred embodiment, an exemplary cover retaining element is peripheral-edge-threads (46a, FIG. 9b). The peripheral-edge-threads (46a) are suitable for being mechanically associated with the receiver inner-wall threads (23) allowing the cover (40) to be screwed into cover receiver portion (22).

For one preferred embodiment, both a retaining ring and peripheral-edge-threads are used to associate cover (40) with housing (12). For yet another embodiment, a simple clip is used instead of a retaining ring (e.g. C-Clip, Seeger ring, snap ring and Jesus clip, etc.).

Freeze Protection

Embodiments of housing assembly (11) are configured to address overpressure conditions to eliminate or limit damage to meter (10) by designing in a "weakest link". Preferably, replacing the weakest link results in the lowest repair costs compared to other components. The weakest link of housing assembly (11) is defined as the component that will fail first during overpressure conditions. Overpressure conditions occur when the pressures inside housing assembly (11) exceed the rated operating pressure. For the preferred embodiment such rated operating pressure is at least 200 psi.

For one embodiment, the cover (40) inner-cover-thickness (49) is suitably sized to be the weakest link of housing assembly (11). Should the fluid in meter (10) freeze, for example, cover (40) will be the component that fails.

For one alternative embodiment, cover (40) is again made the weakest link using a different method. Here housing (11)

is composed of a first material and cover (40) is composed of a second material where the second material is mechanically (structurally) weaker than the first material so that cover (40) fails under pressure before said housing (11). For example, housing (11) could be made of brass and cover (40) could be made of a weaker and less expensive composite material.

For yet another alternative embodiment, cover (40) is again made the weakest link using yet another method. For this currently preferred embodiment, the retaining element is peripheral-edge-threads (46a, FIG. 9b). Further, peripheral-edge-threads (46) are configured to fail under pressure without damaging receiver inner-wall threads (23). For this embodiment, if a retaining ring or a clip is used it too would be configured to fail before housing (11).

Flow Control Devices

Attention is now directed to the flow control features of the current inventions. As is well known, if a water supply system has issues resulting in loss of supply pressure, the water source pressure is likely to drop below the pressure at a water consumer. Under such conditions, water can back-flow from the water consumer through the water meter and back into the water source. If such back flow is contaminated the water source becomes contaminated and such contaminated water is then supplied to "downstream" consumers. Additionally, back flow from a residential consumer can cause the consumer's water heater to drain dry thereby damaging such water heater.

Figure 8A:
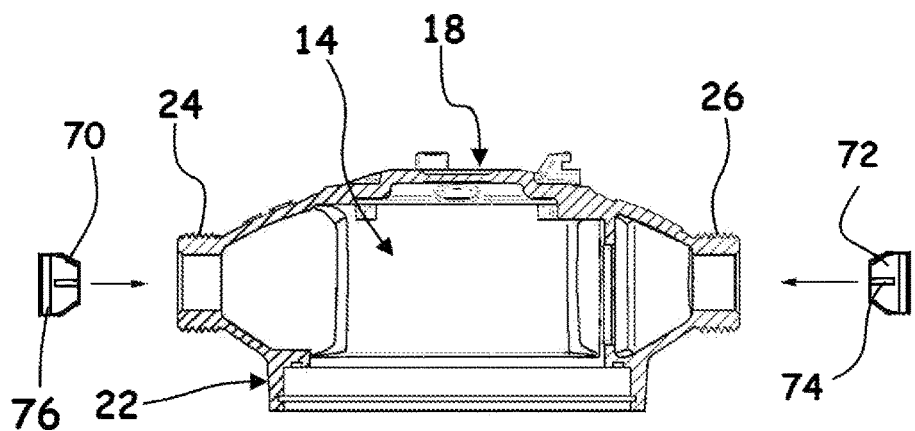
FIG. 8a is a side elevational view of a meter housing from the perspective of cut away section A where the input and output ports are configured to receive flow control modules/inserts.
Figure 8B:
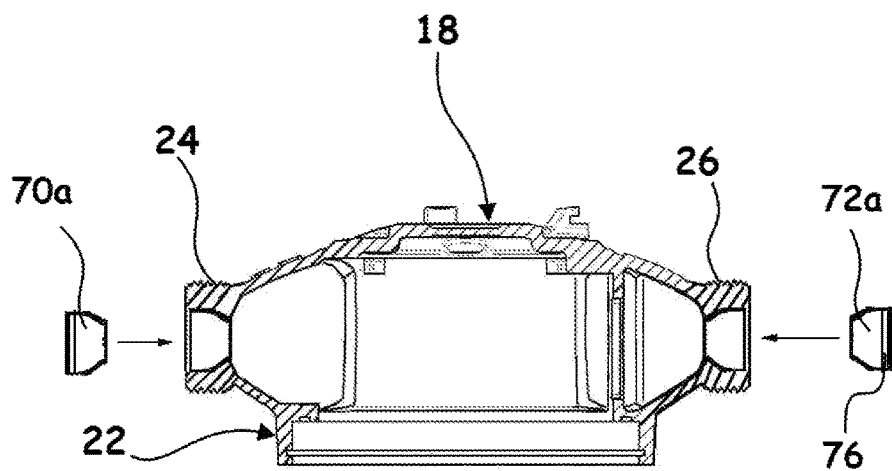
FIG. 8b is a side elevational view of a meter housing showing an alternative embodiment from the perspective of cut away section A where the input and output ports are configured to receive flow control modules/inserts.

Referring now to FIG. 8a and FIG. 8b, and FIG. 13-15, the flow control features of the currently exemplary embodiment of the invention are now considered. As depicted in FIGS. 8a and 8b, the meter-input (24) and meter-output (26) are configured for receiving a flow control device. Exemplary embodiments of such flow control devices included diaphragm check valves, swing check valves, stop-check valves, lift-check valves, in-line check valves and duckbill valves.

For the currently preferred embodiment, the flow control devices are inline check valves (70, 72). It will be appreciated that flow control device (70) is different from flow control device (72) as the flow control device input and output "flip" so to allow flow in only one direction through the meter. As depicted for the embodiment in FIG. 8a, the meter-input (24) port and meter-output (26) port are machined to define a port-shelf (78). An input flow control device (70) is pressed into the meter-input (24) port so optional device stops (74) come in contact with port-shelf (78) so that device-seal (76) forms a seal with the inside surface of meter-input (24) port. Similarly, an output flow control device (72) is pressed into the meter-output (26) port so that device-seal (74) forms a seal with the inside surface of meter-output (24) port.

Figure 14:
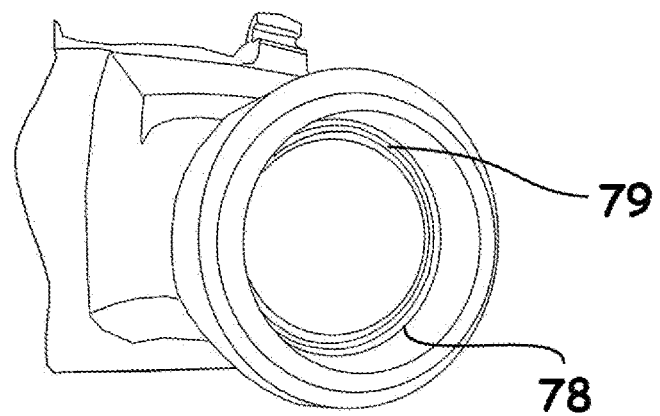
FIG. 14 is a side perspective view of and meter port defining a flow-control-device interface further defining a port sealing member receiver.
Figure 15:
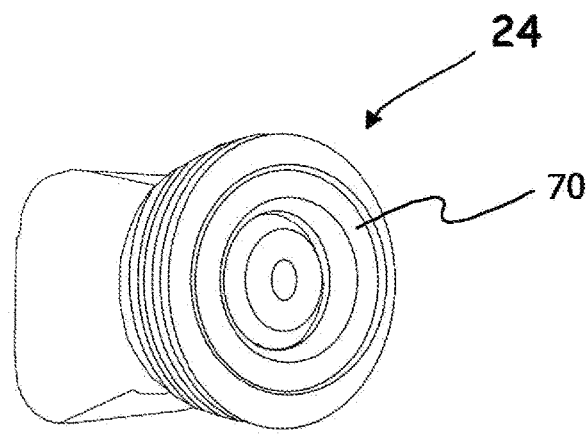
FIG. 15 is a side perspective view of a meter port associated with a flow-control-device.

For the alternative embodiment depicted in FIG. 14, the device-shelf further defines a port-shelf-seal-receiver (79) configured for receiving a port-shelf-sealing-member such as an O-ring. For such embodiment, the flow control device provides a sealing surface thereby making device seal (76) unnecessary.

Figure 16:
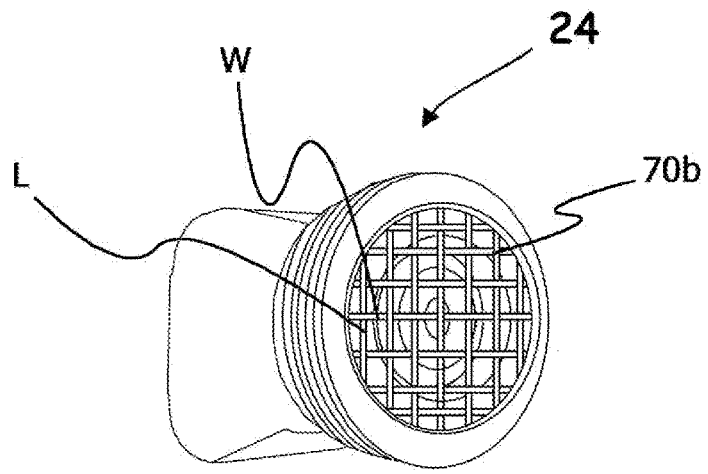
FIG. 16 is a side perspective view of a meter port associated with a flow-control-device comprising flow limiting grid.

As depicted in FIG. 16, the flow control devices may define an additional flow limiter. More specifically, flow control device (70) defines a flow limiting element (70b). As depicted in FIG. 16, for the currently preferred embodiment, flow limiting element (70b) defines a grid structure defining a plurality of flow paths having a predefined opening-area. For the currently preferred embodiment, such flow path openings define square perimeters (although any shape may be used) in the middle portion and partial square perimeters around the perimeter portion. The opening-area of the opening for each flow path will be defined as $A = L \times W$ (for full squares) and $A = (L \times W) - c$ for partial squares where c is the estimated correction for a partial square. One of ordinary skill in the art will appreciate that the volume of flow through the associated port will be limited by the opening-area for each flow path. By reducing such area (e.g. by making the perimeter walls of each flow path thicker) the volume of flow through the associated port is reduced accordingly.

Flow limiting element (70b) may be integral to a flow control device or mechanically associated with a flow control device so that different flow limiting elements may be used for different installations. For the preferred embodiment, flow limiting element (70b) is an integral component of the flow control element. Notably, a collateral benefit of using a flow limiting element (70b) is that debris having a size larger than the opening-area will be blocked from entering the associated port.

The flow control devices associated with the input and output of the housing are preferably further configured to enhance low flow accuracy of the meter. As is well known in the art, meters do not measure all flow rates with the same accuracy. Indeed, at very low flow rates the fluid does not have the energy required to "start" a meter's measurement elements resulting in unmetered flow through the meter (although at an ultra-low flow rate). Notably, for a $\frac{1}{16}$ gallon/minute flow rate (a drip not normally detectable by most meters) will result in over 30,000 gallons of unmetered water over 365 days ($\frac{1}{16}$ gallons/minute$\times$60 minutes/1 hour$\times$24 hours/1 day$\times$365 days/year).

To enhance the ultra-low flow accuracy of the meter, the flow control devices are preferably configured to prevent continuous "ultra-low flow" (flow rates of $\frac{1}{16}$ gallon/minute or lower) by defining a type of flow control device hysteresis. At ultra-low flow rates, the flow control devices (70, 72) require a slight build up in pressure (a pressure differential) before allowing flow resulting in "surge" flow (similar to a pulse) at ultra-low flow rates where such "surge" has sufficient energy to activate the meter's measurement elements. Once the meter's measurement elements have started they can measure flow rates that do not have enough energy to start the measurement elements but do have enough energy to maintain measurement element movement. This "hysteresis" functionality may be achieved by adding a close-bias to the flow control device (70) requiring a fixed amount of pressure differential (between 5 psi and 10 psi) between the input and the output of the flow control device (70) before it opens allowing a "surge" of fluid flow. Such "surge flow" continues until the pressure equalizes between the input and the output of the flow control device (70) (or the meter depending on the configuration) when the close-bias causes the flow control device to close and prevent fluid flow until the predefined pressure differential builds up again causing the process to repeat.

Such functionality may be embodied in the input flow control device (70). Alternatively, input flow control device (70) and output flow control device (72) can be configured to provide the pressure differential "hysteresis" by configuring such devices with different close-bias points.

Figure 3:
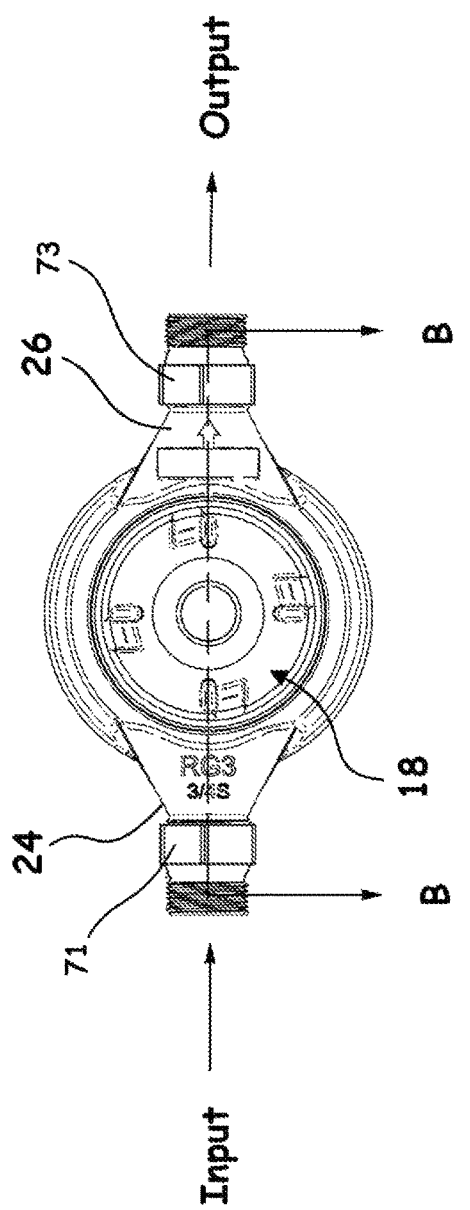
FIG. 3 is a top plan view of a meter housing assembly according to one exemplary embodiment of the invention with a flow control coupling associated with the input and output of meter.
Figure 4:
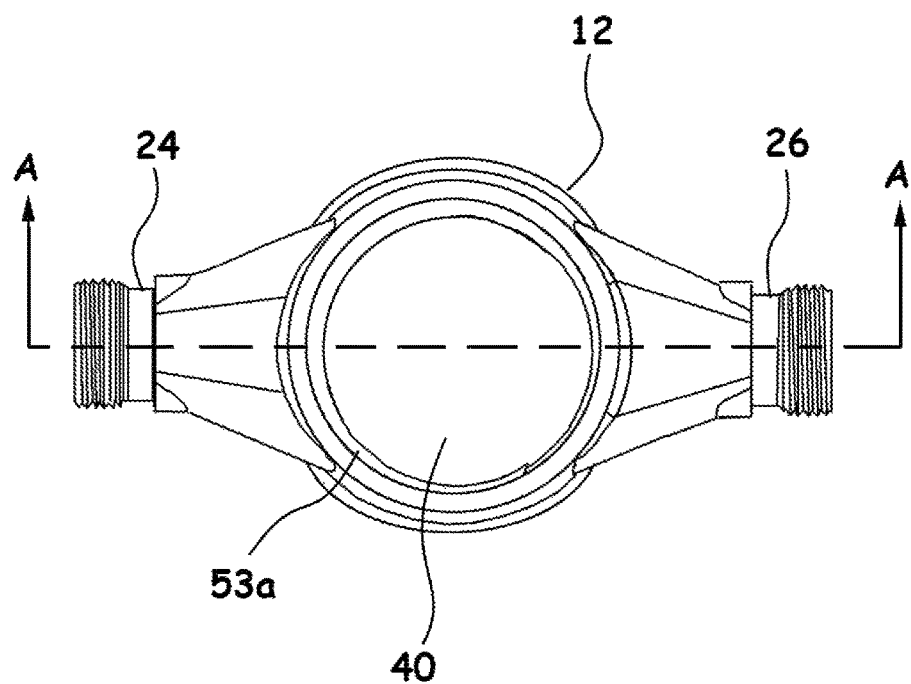
FIG. 4 is a bottom plan view of a meter housing assembly according to one exemplary embodiment of the invention and defining cutaway view A.

As depicted in FIG. 3, such flow control features may be incorporated into a coupling such as flow control coupling (71) and flow control coupling (73). Such couplings may be configured to provide the same or similar features as flow limiting elements (70), (70a), and (72). One of ordinary skill in the art will appreciate that such flow control couplings can be associated with prior art meters not suitable for receiving flow control inserts and such couplings may also be configured to provide an adapter function for associating the meter ports to different size pipes.

For yet another alternative embodiment depicted in FIG. 8b, meter-input (24) port and meter-output (26) port are machined with a tapper so that no port-shelf is required.

It should be appreciated that some installation sites may not desire flow control devices but may desire flow limiting. Thus, for yet another embodiment, input-port (24) and output-port (26) define an opening that provides a predefined maximum flow rate. When desired, meter input-port (24) and/or meter output port (26) are configured to receive a flow limiting device insert comprising one of a plurality of flow-rate-blanks configured to suitably size such ports to provide a predefined flow rate. Such flow-rate-blanks ("blanks" means no flow control element such as a check valve) may be associated with a flow limiting element (70b) that provides a flow limiting function and a debris blocking function.

Figure 26:
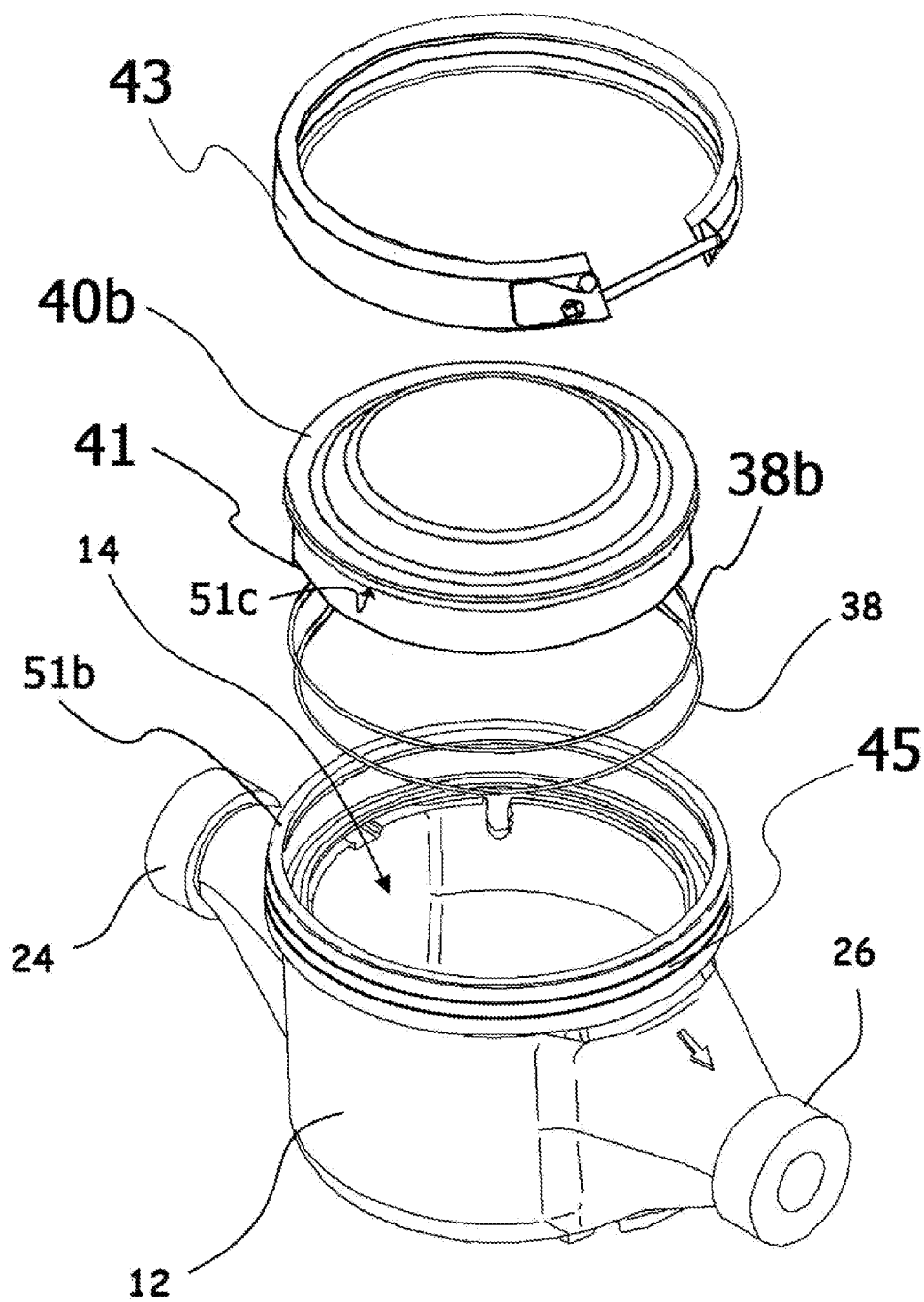
FIG. 26 is an exploded perspective view of one exemplary alternative embodiment of a meter housing assembly comprising clamping technology.
Figure 27:
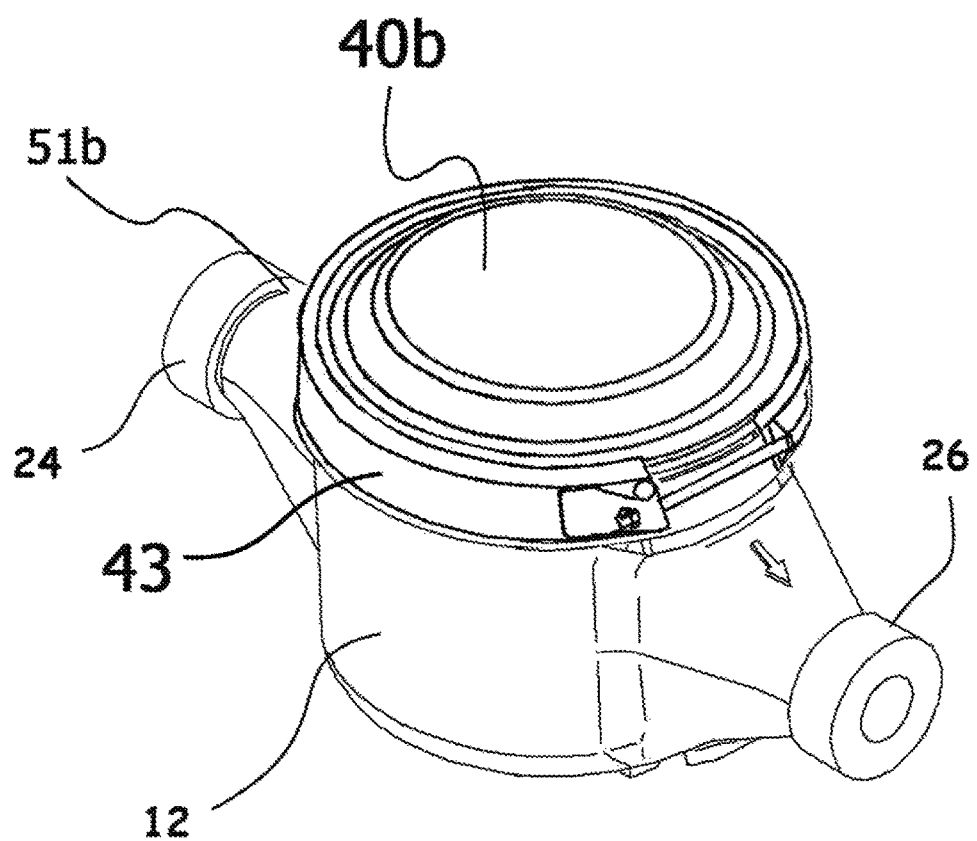
FIG. 27 is an assembled view of the configuration depicted in FIG. 26.

Referring now to FIG. 26 and FIG. 27, another alternative embodiment of a housing assembly (11) is presented. FIG. 27 presents an assembled view and FIG. 26 presents an exploded view. As before, housing assembly (11) comprises a housing (12) removably associated with a cover to define a housing-void (14) there between wherein said void is configured for receiving flow measurement components (not shown). However, for the currently preferred exemplary embodiment, cover (40b) has been modified to define a mushroom shape having a top section and a depending base (41). The current embodiment further includes a first sealing-member (38) and an optional second sealing-member (38b). Sealing member (38b) is configured for being associated with wall-channel (56) and seal with the outer surface of depending base (41). Similarly, surface 51(c) may be configured to seal with base surface (51b).

Replacing the retaining ring (53a) in the current exemplary embodiment is a clamping-member (43). Suitable embodiments of a clamping-member include v-band clamps.

Ornamental Designs

Figure 17:
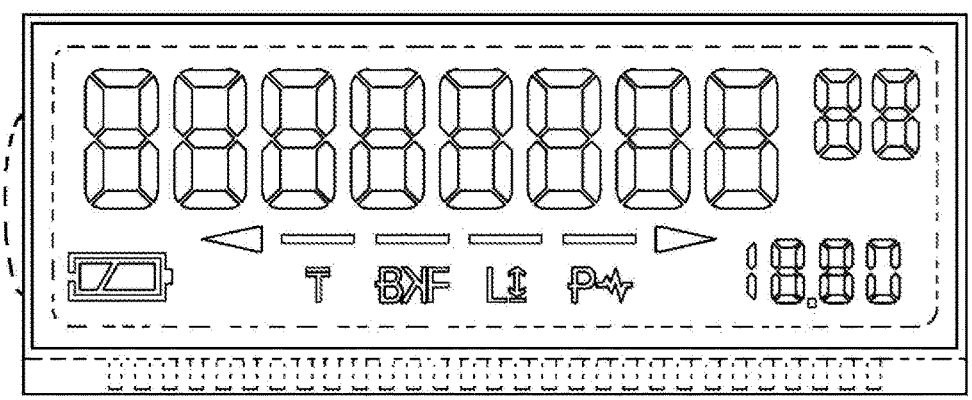
FIG. 17 is a front elevational view of a display.
Figure 18:
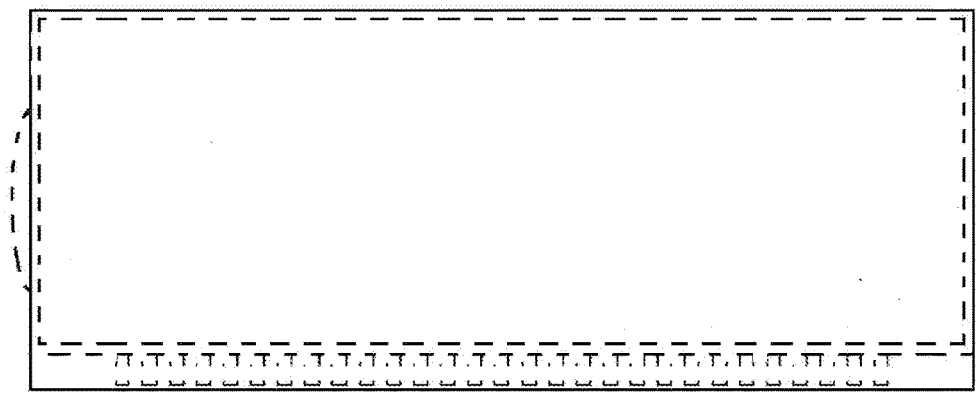
FIG. 18 is a back elevational view thereof.
Figure 21:
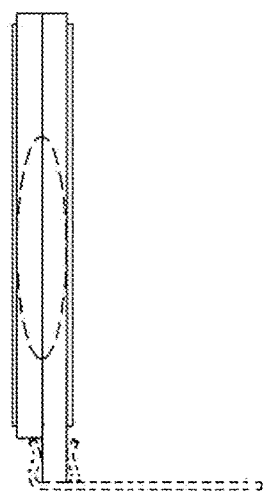
FIG. 21 is an elevational view of a first side thereof.
Figure 22:
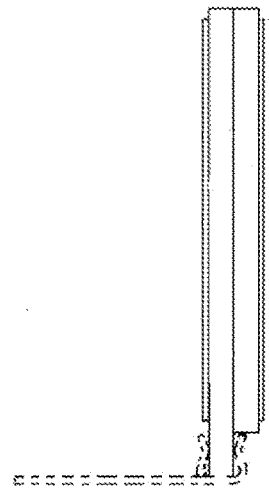
FIG. 22 is an elevational view of a second side thereof.

Attention is now directed to the new, original, and ornamental designs associated with components of register (20). Register (20) comprises a display device for displaying consumption readings. Embodiments of such display device include LCD displays of which: FIG. 17 is a front elevational view thereof; FIG. 18 is a back elevational view thereof; FIG. 19 is a bottom plan view thereof; FIG. 20 is a top plan view thereof; FIG. 21 is an elevational view of a first side thereof; and FIG. 22 is an elevational view of a second side thereof. The broken lines in a drawing illustrate environmental structure and portions of the device that form no part of the claimed design.

Figure 23A:
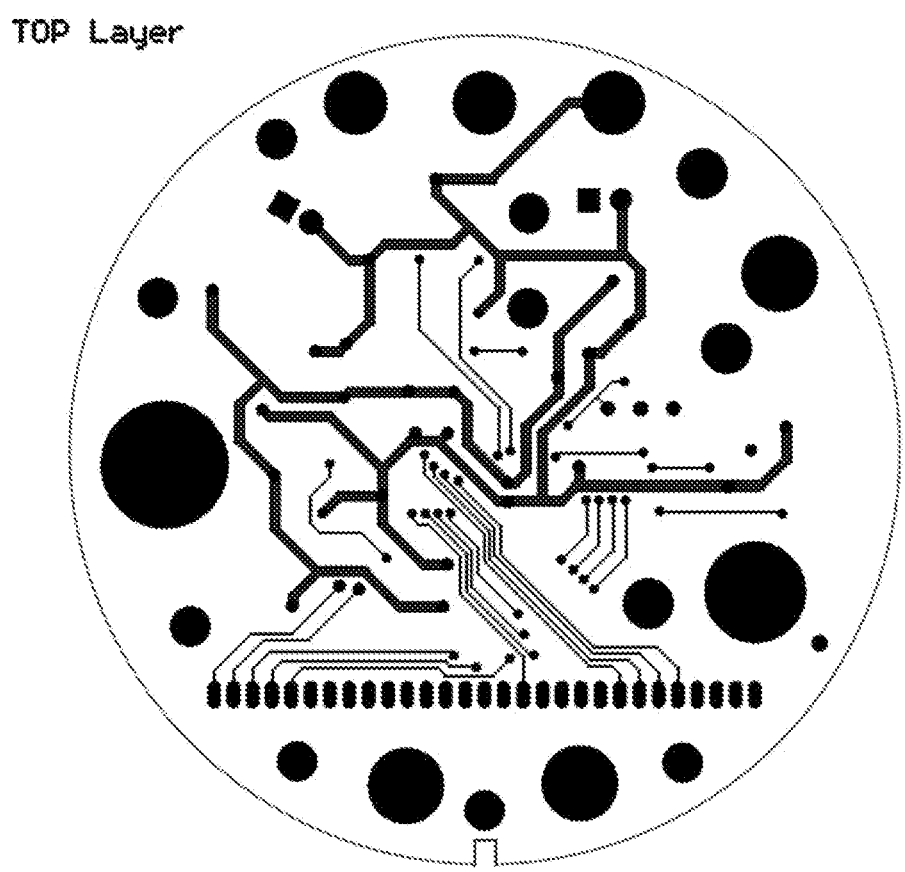
FIG. 23a is a top plan view of a register circuit board.
Figure 23B:
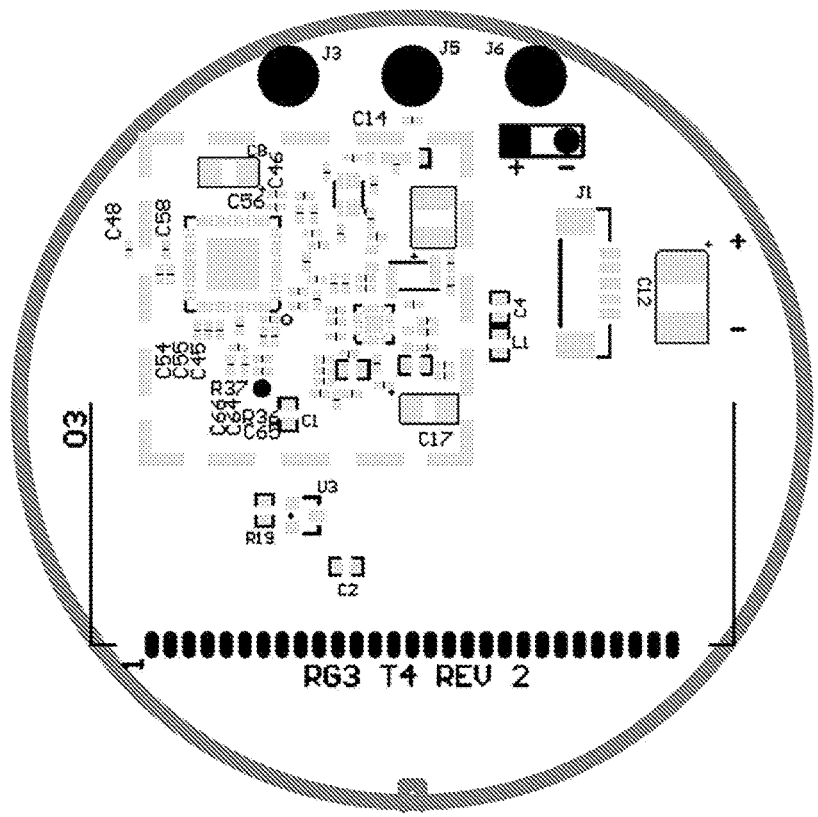
FIG. 23b is a top plan view of an alternative view thereof.
Figure 24A:
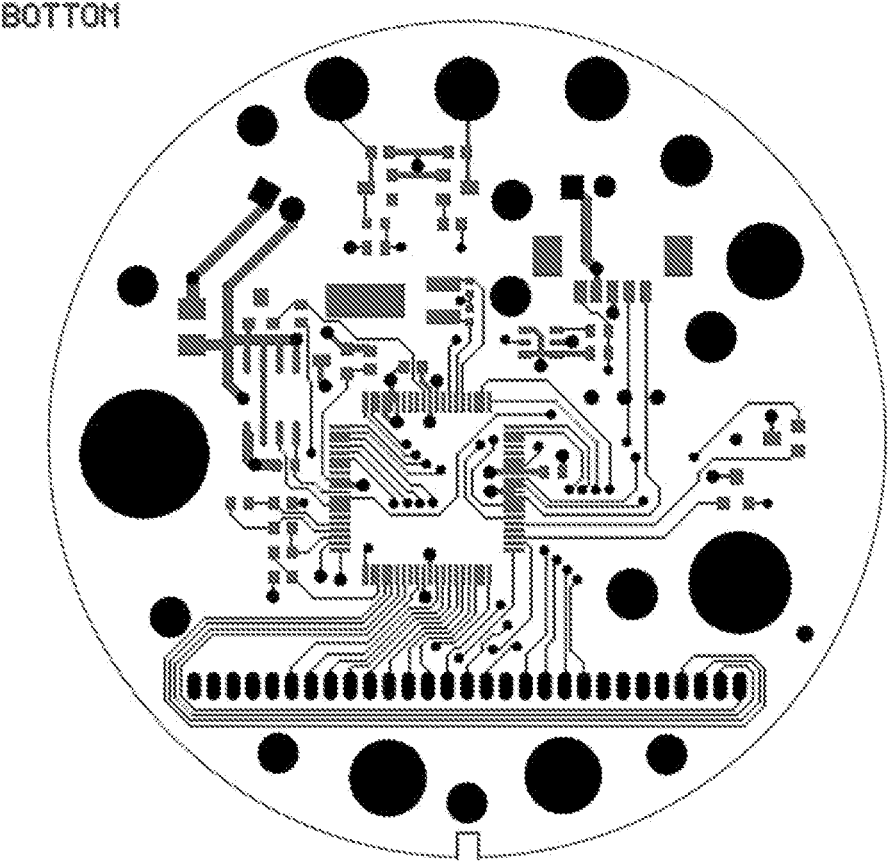
FIG. 24a is a bottom plan view thereof.
Figure 24B:
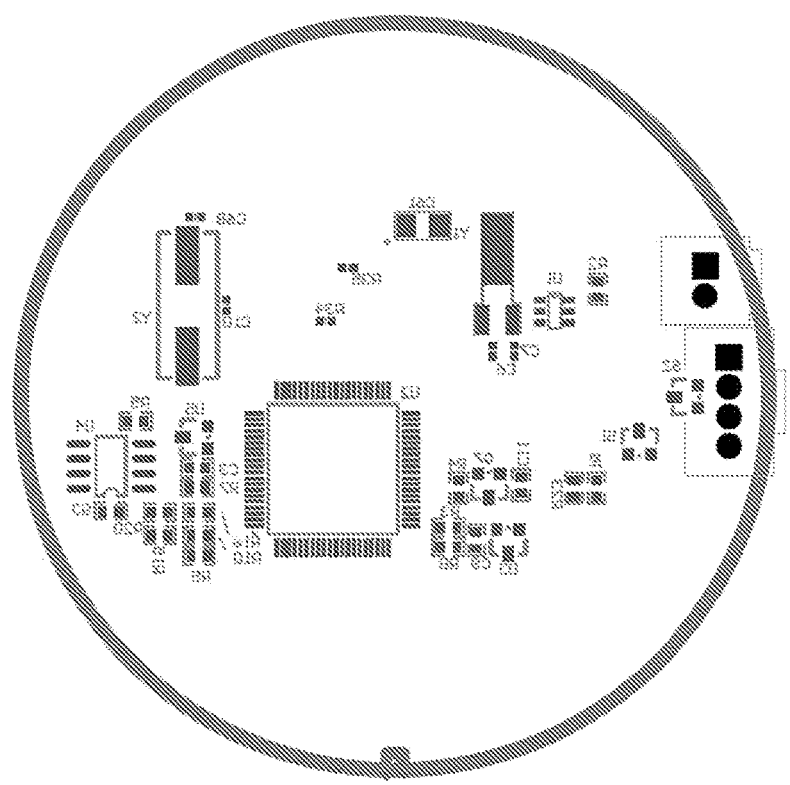
FIG. 24b is a bottom plan view of an alternative view therefor.
Figure 25:
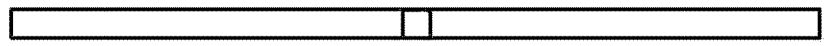
FIG. 25 is an elevational view thereof.

Referring now to FIGS. 23, 24, and 25, attention is directed to the new, original, and ornamental designs associated with a register (20) circuit board. Embodiments of such circuit board include multilayer boards of which: FIG. 23a is a top plan view thereof; FIG. 24a is a bottom plan view thereof; FIG. 23b is an alternative embodiment of the top plain view thereof; FIG. 24b is an alternative embodiment of a bottom plan view thereof; and FIG. 25 is an elevational side view thereof.

Magnetic Check Shutoff Valve System

Figure 28:
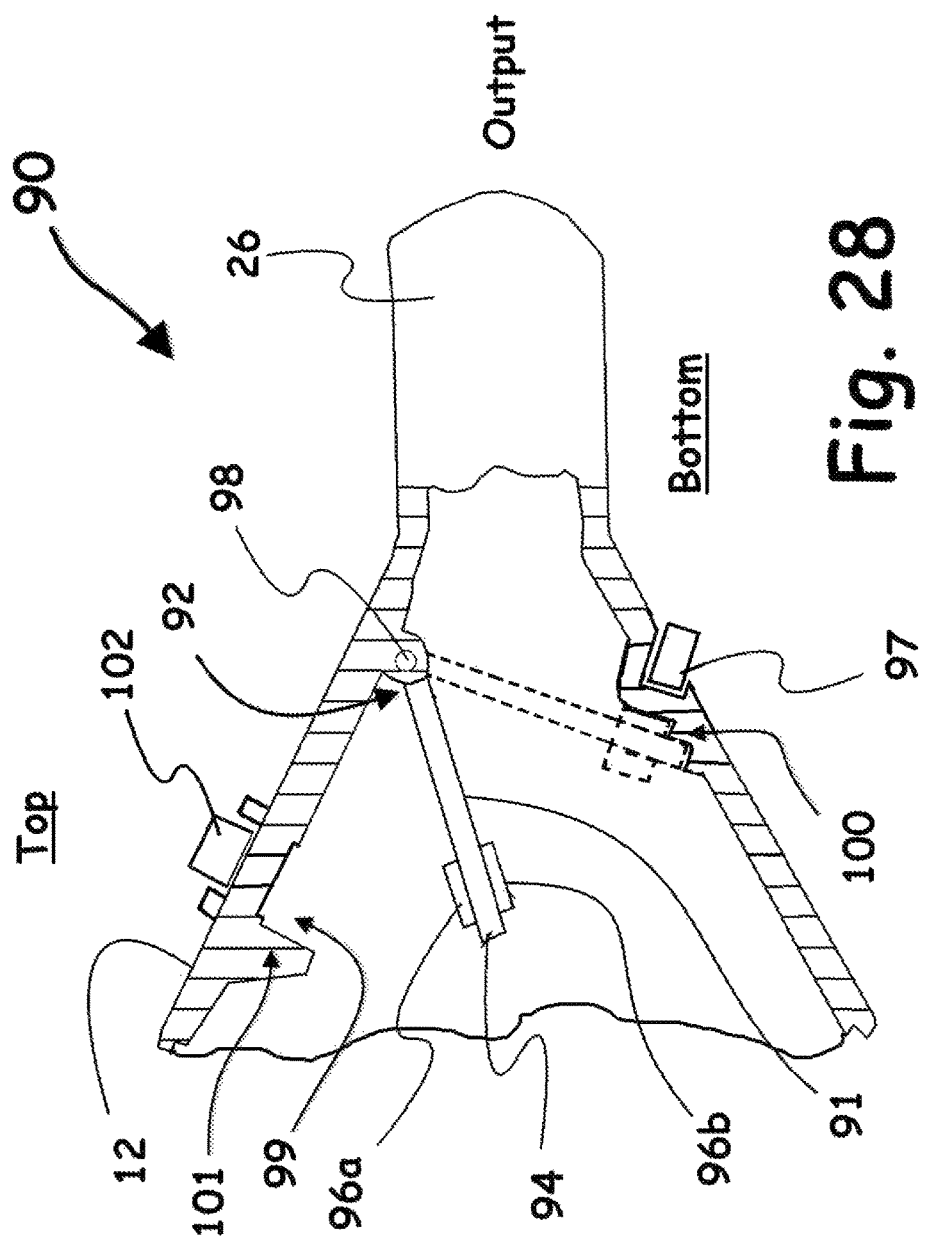
FIG. 28 is a side elevated view defining a cut away section of the output portion of a water meter revealing one embodiment of a magnetic shutoff valve.

Attention is now directed to FIG. 28 wherein a side cutaway view of a portion of the output (26) of meter housing (12) presents one exemplary embodiment of a Magnetic Shutoff Valve (MSV) (90). Such exemplary MSV (90) comprises of a non-ferrous flow-limiter (91) defining a first end (94) and an opposing second end (92). Suitable embodiments of flow-limiters include flappers and valve doors. The first end (94) of flow-limiter (91) is associated with a FL-magnetic-element (96) and the opposing second end (92) defines a pivot interface. FL-magnetic-element (96) may comprise one magnetic element that extends through first end (94) in which case one end of such magnetic element will have an "N" polarity and the opposing end will have an "S" polarity. Alternatively, a plurality of magnetic elements (such as 96a, 96b) may be used and configured so that the ends of such combined magnetic element have opposite polarities. One embodiment of Magnetic element (96) includes rare earth magnets.

The opposing second end (92) defines a pivot interface configured for being mechanically associated with a pivot member (98). One embodiment of a pivot member (98) includes a spring loaded rod assembly configured with a spring bias that tends to keep the flow limiter (91) against the shutoff-open-interface (99)) defined by the meter housing (12) on the output Side of the meter casting (downstream from the meter's measurement mechanism or device).

It will be further appreciated that pivot member (98) is disposed on one side of the flow path as opposed to some point between the sides of the flow path (such as the middle). Such a configuration minimizes the affect the flow limiter will have on fluid flow when in the open position. That said, pivot member (98) locations at points within the flow path fall within the scope and spirit of the invention.

In addition to the spring bias pressure, a shutoff-actuator (102) may be disposed outside of the meter housing (12) configured to be selectively controlled to either attract FL-magnetic-element (96) or repel FL-magnetic-element (96). When selected to attract FL-magnetic-element (96), the combined force of the spring bias and the shutoff-actuator magnetic attraction is of sufficient strength to keep the flow limiter (91) associated with the shutoff-open-interface (99) thereby allowing flow through the meter output (26).

An optional flow-diverter (101) may be provided to deflect the fluid flow to minimize the fluid flow to and between the meter housing (12) and the flow limiter (91) to prevent such flow from achieving sufficient force to cause flow-limiter (91) to swing downward resulting in an undesired shutoff condition. Embodiments of such flow-diverter (101) include a raised feature internal to the meter housing as depicted in FIG. 28.

One of ordinary skill in the art will appreciate that meter housing (12) should define or include a shutoff-closed-interface (100) comprising features that would allow flow limiter (91) to seal against such features to minimize or prevent flow through the meter when the shutoff valve in the closed position. Such sealing surface geometries, materials, and configurations are diverse and well known by those of ordinary skill in the art making a detailed description of such features unnecessary to enable the invention. Such features are selected and implemented by those skilled in the art in multiple embodiments as required for the fluid, fluid velocities, pressures, operating temperatures, and other parameters as necessitated by the end application of the meter.

For one embodiment, shutoff-actuator (102) is a magnet and actuation of the Shut Off Valve to the Closed position is accomplished by orienting shutoff-actuator (102) so that the magnetic pole of the shutoff-actuator and FL-magnetic-element (96) oppose each other thereby repelling the FL-magnetic-element with sufficient force to push flow-limiter

(91) into the flow path of the fluid passing through the meter and thus pushing the flow-limiter (92) against shutoff-closed-interface (100). Thus, such opposing force generated by the magnet is preferably at least slightly greater than the spring bias force.

Optional retention-element (97) may be associated with shutoff-closed interface (100) to help maintain flow limiter (91) in the closed position as well as repel flow limiter (91) from the closed position toward the open position. As before, retention-element (97) may be a magnetic element defining an "N" pole and "S" pole. When retention-element (97) is used to enhance the force keeping flow limiter (91) in the closed position, retention-element (97) is oriented to attract FL-magnetic-element (96). Conversely, when retention-element (97) is used to repel flow limiter (91) toward the open position, retention-element (97) is oriented to repel FL-magnetic-element (96).

Similarly, to move flow-limiter (91) from shutoff-closed-interface (100) to shutoff-open-interface (99), shutoff-actuator (102) and retention-element (97) are re-oriented. More specifically, the poles of shutoff-actuator (102) are reversed so as to attract FL-magnetic-element (96). Similarly, retention-element (97) is oriented (or its poles reversed) to repel FL-magnetic-element (96) thereby allowing the spring bias to return flow-limiter (91) to shutoff-open-interface (99).

Notably, changing the open/closed stated of flow-limiter (91) may be aided by equalizing the pressure of fluid on either side of flow-limiter (91) through the meter by either stopping the flow of fluid through the meter and thus achieving an equilibrium of pressure, or by means of an orifice or sealing surface feature that allows sufficient fluid to pass to the other side of flow-limiter (91) to achieve an equilibrium of pressure during the next period of reduced or low volume of flow sufficient enough to achieve an equilibrium of pressure on each side of flow-limiter (91), and thus allowing the hinge spring to return the valve door to the top of the meter housing where it can be additionally held in place by the shutoff-actuator (102) which has been configured to present an attracting force to attract FL-magnetic-element (96) thus keeping the valve in the open position.

It will be appreciated that the shutoff-actuator (102) may be a rare earth magnet that can be moved mechanically or electromechanically to present either a North or South Pole to attract or repel FL-magnetic-element (96). Mechanical embodiments of the magnet reversing mechanisms may be comprised of a rotating element that the magnet is affixed, a cam or lever mechanism that alternately moves two magnets of opposite pole presentations in concert so as to provide communication of the required magnetic field to the magnet of the flow-limiter (91) to effect the desired opening or closing action of the valve. The actuating force for such mechanisms can be input by manual means through a lever or button mechanism as commonly implemented in the art, or alternately by electrical, pneumatic, hydraulic, or other common means.

For the preferred embodiment, the implementation of the instant invention provides for the proposed meter valve to be held in the open or closed state without the input of continuous external force thus achieving a true latched mechanism. In an alternate embodiment of the instant invention, the required actuating magnetic field required for opening and closing this novel meter valve mechanism can be presented by means of an electromagnet controlled by exterior means and controlled locally by means of a switch and electrical power supply, or remotely by means of an electrical or electronic control device that responds to commands communicated to it by wired or wireless means, or in response to some external influence such as a remote switch or sensor.

As noted above, both the shutoff-actuator (102) and retention-element (97) may be represented by a magnet such as a rare earth magnet. It will be appreciated that one magnet may be used to provide both functions where such magnet is simply moved between interfaces (99) and (100).

Adjustable Hysteresis Magnetic Check Valve

Figure 29:
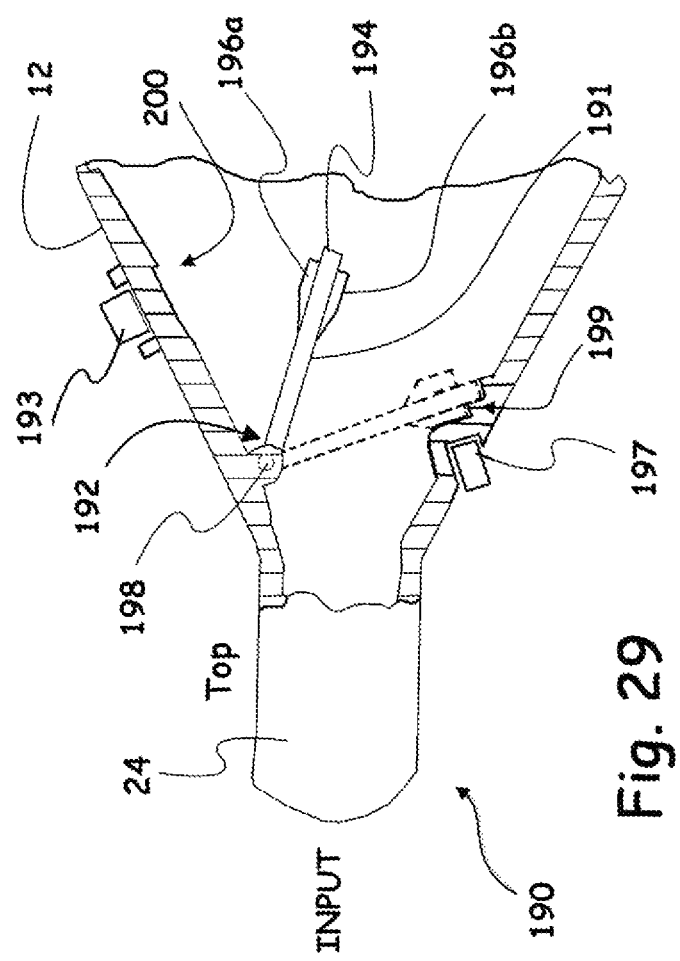
FIG. 29 is a side elevated view defining a cut away section of the input portion of a water meter revealing one embodiment of a magnetic check valve with adjustable hysteresis.

Attention is now directed to FIG. 29 wherein a side cutaway view of a portion of meter input (24) of meter housing (12) presents one exemplary embodiment of a Magnetic Check Valve (McVAH) (190). Such exemplary McVAH (190) comprises a non-ferrous flow-limiter (191) defining a first cv end (194) and an opposing second cv end (192). Suitable embodiments of flow-limiters include flappers and valve doors. Similar to the shutoff valve described above, first cv end (194) of flow-limiter (191) is associated with a FL-magnetic-element (196) and the opposing second cv end (192) defines a pivot interface. FL-magnetic-element (196) may comprise one magnetic element that extends through first end (194) in which case one end of such magnetic element will have an "N" polarity and the opposing end will have an "S" polarity. Alternatively, a plurality of magnetic elements (such as 196a, 196b) may be used and configured so that the ends of such combined magnetic element have opposite polarities. One embodiment of Magnetic element (196) includes rare earth magnets.

The opposing second cv end (192) defines a pivot interface configured for being mechanically associated with a pivot member (198). One embodiment of a pivot member (198) includes a spring loaded rod assembly configured to generate a spring bias that tends to keep the flow limiter (191) against the cv-closed-interface (199) defined by the meter housing (12) on the input Side of the meter casting (upstream from the meter's measurement mechanism or device).

It will be further appreciated that pivot member (198) is disposed on one side of the flow path as opposed to some point between the sides of the flow path (such as the middle). Such a configuration minimizes the affect the flow limiter will have on fluid flow when in the open position. That said, pivot member (198) locations at points within the flow path fall within the scope and spirit of the invention.

In addition to the spring bias pressure, a CV-retention-element (197) may be disposed outside of the meter housing (12) configured to be selectively controlled to either attract FL-magnetic-element (196) or repel FL-magnetic-element (196). When selected to attract FL-magnetic-element (196), the combined force of the spring bias and the magnetic attraction of the CV-retention-element (197) is preferably of sufficient strength to keep the flow limiter (191) associated with the cv-closed-interface (199) until the pressure on the output side of the flow limiter (191) is between 5 and 15 psi lower than the pressure on the input side (side closest to the water meter input) of flow limiter (191) thereby blocking flow in both directions.

As noted above, cv-closed-interface (199) should define a sealing surface comprising geometries, materials, and configurations to be selected and implemented by those skilled in the art in multiple embodiments as required for the fluid, fluid velocities, pressures, operating temperatures, and other parameters as necessitated by the end application of the meter.

The flow limiter (191) is preferably configured to resist the pressure of the metered fluid and remain closed up to the combined force of the spring bias and the magnetic attraction of the cv-retention magnet (about 15 psi). When sufficient pressure at the input of the meter is reached, such fluid pressure moves flow limiter toward optional open interface (200). Since the magnetic force decreases over the square of the distance, the release of flow limiter (191) would be dramatic and provide a snap action to the opening of the magnetic check valve (190) resulting in a "surge" at low flow rates. Such "surge" at low flow rates would preferably have sufficient energy to start the measuring elements of the meter to allow such meter to measure low flow rates normally too low to start the measurement elements.

By adjusting the gauss strength of the magnetic elements employed, the hysteresis between the opening and closing forces of the check valve can be widened or narrowed depending on the requirements of the application. In an alternate embodiment of the instant invention, the magnet external to the meter housing can be moved closer and further away by mechanical means to provide for a means of adjusting the opening and closing points of the check valve after the meter has been installed.

A cv-open-interface (200) and a disable-element (193) are optionally provided to allow the magnetic check valve (190) to be disabled. For such optional alternative embodiment, disable-element (193) generates a magnetic field that attracts FL-magnetic-element (196) to maintain an association between flow-limiter (191) and cv-open-interface (200) until disable-element (193) is removed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A housing assembly for a flow meter configured for measuring the flow of a liquid, said housing assembly comprising:
    a housing defining a housing-void configured for receiving flow measurement components, wherein an outer surface of said housing further defines a register interface configured for being mechanically associated with a register, and wherein said housing further defines a cover receiver portion defining an distal-end and receiver inner-wall defining inner-wall-threads;
    wherein said housing further comprises an input-port and an output-port wherein said input-port is configured for being associated with a fluid source to allow fluid flow into said housing-void and said output-port is configured for being associated with a supply line to allow fluid flow out of said housing-void;
    wherein said receiver inner-wall defines a shelf that extends perpendicularly form said receiver inner-wall a predefined distance thereby defining a shelf-surface having a shelf-width wherein said shelf is located a predefined shelf-offset-distance from said distal-end and wherein said shelf-surface further defines a sealing-member-receiver running angularly along said shelf-surface, said sealing-member-receiver configured for receiving an O-Ring sealing-member and wherein said sealing-member-receiver defines a channel suitably sized to receive said O-ring and wherein said working fluid pressure is at least 200-PSI;
    a cover defining inside cover surface and an opposing outside cover surface connected by a peripheral edge, said cover further defining a perimeter-cover-thickness and an inner-cover-thickness and further defining a sealing surface running along the perimeter of said inside cover surface, said cover suitably configured to be associated with said cover-receiver so that said sealing surface is associated with said sealing-member; and
    wherein said peripheral edge defines peripheral-edge-threads configured for being mechanically associated with said inner-wall-threads.

2. A housing assembly for a flow meter as in claim 1, wherein the inside cover surface further defines a retaining-element-receiver configured to receive a cover-retaining-element.

3. A housing assembly for a flow meter as in claim 1, wherein said cover inner-cover-thickness is suitably sized to be the weakest part of said housing assembly so that said cover does not fail under said predefined working fluid pressure but is the first housing assembly part to fail at pressures above said predefined working fluid pressure.

4. A housing assembly for a flow meter as in claim 1, wherein said inner-wall-threads are disposed along said receiver inner-wall from a point between said shelf-surface and said distal-end to a predefined thread-end-point, and (b) a wall-channel running angularly around said receiver inner-wall and disposed along said receiver inner-wall at a distance greater than or equal to said cover-thickness from said shelf-surface; and
    a clip configured for being mechanically associated with said wall-channel.

5. A housing assembly for a flow meter as in claim 4, wherein said clip is a c-clip.

6. A housing assembly for a flow meter as in claim 1, wherein said housing is composed of a first material and said cover is composed of a second material and wherein said second material is mechanically weaker than said first material so that said cover fails under pressure before said housing.

7. A housing assembly for a flow meter as in claim 6, wherein said peripheral-edge-threads fail under pressure without damaging said inner-wall threads.

8. A housing assembly for a flow meter as in claim 6, wherein said first material is brass and said second material is a composite material.

9. A housing assembly for a flow meter as in claim 1, wherein said input-port and said output-port define a port-wall thickness while defining an opening that provides a predefined flow rate and is further suitably sized for being selectively drilled to provide room for a port check valve insert that provides for said predefined flow rate.

10. A housing assembly for a flow meter as in claim 1, wherein said input-port and said output-port define a port-wall suitably sized to receive an insert consisting of: (a) one of a plurality of flow-rate-blanks configured to suitably size said ports to provide a predefined flow rate; and (b) one of a plurality of check valve inserts suitably configured to provide a predefined flow rate.

11. A fluid flow meter configured for measuring the flow of a fluid, said fluid flow meter comprising:
    a housing assembly comprising a housing removably associated with a cover, said housing and said cover defining a housing-void there between configured for receiving flow measurement elements and wherein an outer surface of said housing further defines a register interface configured for being mechanically associated with a register, and wherein said housing further defines a cover receiver portion defining an distal-end and receiver inner-wall defining a retaining-element-receiver configured for being securely and removably associated with a cover-retaining-element and wherein said housing further comprises an input-port and an output-port wherein said input-port is configured for being associated with a fluid source to allow fluid flow into said housing-void and said output-port is configured for being associated with a supply line to allow fluid flow out of said housing-void;

flow measurement elements disposed in said housing-void and configured to generate flow signals indicative of the rate of fluid flow through said housing assembly;

wherein said receiver inner-wall defines a shelf that extends perpendicularly form said receiver inner-wall a predefined distance thereby defining a shelf-surface having a shelf-width wherein said shelf is located a predefined shelf-offset-distance from said distal-end;

wherein said shelf-surface further defines a sealing-member-receiver running angularly along said shelf-surface, said sealing-member-receiver configured for receiving a sealing-member;

a sealing-member removably associated with said sealing-member-receiver wherein said sealing-member is an O-ring and said sealing-member-receiver is a channel suitably sized to receive said O-ring to define a fluid tight seal for a working fluid pressure of at least 200-PSI when said cover is secured in place by said cover-retaining-element;

a cover defining an inside cover surface and an opposing outside cover surface connected by a peripheral edge, said cover further defining a perimeter-cover-thickness and an inner-cover-thickness and further defining a sealing surface running along the perimeter of said inside cover surface, said cover suitably configured to be associated with said cover receiver portion so that said sealing surface is associated with said sealing-member;

cover-retaining-element configured to be removably associated with said retaining-element-receiver; and a register associated with said register interface, said register configured to receive said flow-signals and generate fluid flow data.

12. A fluid flow meter as in claim 11, wherein said register further comprises automatic meter reading assembly configured to transmit a data-signal to a remote device.

13. A fluid flow meter as in claim 12, wherein said cover inner-cover-thickness is suitably sized to be the weakest part of said housing assembly so that said cover does not fail under said predefined working fluid pressure but is the first housing assembly part to fail at pressures above said predefined working fluid pressure.

14. A fluid flow meter as in claim 11, wherein said receiver inner-wall defines inner-wall-threads and said peripheral edge defines threads and wherein said cover is screwed into said cover receiver portion before being secured in place by said cover-retaining-element.

15. A fluid flow meter as in claim 11, wherein said input-port and said output-port define a port-wall thickness while defining an opening that provides a predefined flow rate and is further suitably sized for being selectively drilled to provide room for a port check valve insert that provides for said predefined flow rate.

16. A fluid flow meter as in claim 11, further comprising a check valve insert mechanically associated with said input-port and a check valve insert mechanically associated with said output-port wherein said check valve inserts are suitably configured to provide a predefined flow rate through said housing.

17. A method of housing flow measurement components, said method comprising:

providing a housing defining a housing-void configured for receiving flow measurement components and wherein an outer surface of said housing further defines a register interface configured for being mechanically associated with a register, and wherein said housing further defines an input-port and an output-port wherein said input-port is configured for being associated with a fluid source to allow fluid flow into said housing-void and said output-port is configured for being associated with a supply line to allow fluid flow out of said housing-void and to fluid usage point;

configuring said housing to further define a cover receiver portion defining a cover-receiver-threads;

providing a sealing-member removably associated with said cover receiver portion wherein said sealing member is an O-ring configured for being mechanically associated with a channel defined by said cover receiver portion and suitably sized to receive said O-ring;

associating a cover defining cover threads with said cover receiver portion so that said sealing-member creates a seal between the cover and the cover receiver portion to define a working fluid pressure of at least 200-PSI; and wherein said cover receiver portion is constructed of stronger material than said cover so that said cover fails under pressure before said cover receiver portion.

18. A method of housing flow measurement components as in claim 17, further comprising the step of configuring said housing with a retaining ring.

19. A method of housing flow measurement components as in claim 18, associating a magnetic check valve with adjustable hysteresis with said input-port wherein said magnetic check valve is suitably configured to create a pulse flow at flow rates of less than $1/14$ of a gallon.

20. A method of housing flow measurement components as in claim 17, wherein said cover threads are configured to be the weakest-link so that the cover threads fail at a higher pressure than said predefined working fluid pressure and at a lower pressure than the remaining housing assembly components.

* * * * *